US012776071B2

(12) United States Patent
Sun et al.

(10) Patent No.: US 12,776,071 B2
(45) Date of Patent: Oct. 27, 2026

(54) IMAGE COMPRESSION METHOD, IMAGE DECOMPRESSION METHOD, AND IMAGE PROCESSING APPARATUS

(71) Applicant: HUAWEI TECHNOLOGIES CO., LTD., Shenzhen (CN)

(72) Inventors: Zhao Yi Sun, Hong Kong (CN); Yuliang Huang, Chengdu (CN); Leonarduzzi Roberto Fabio, Hong Kong (CN); Jie Sun, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 181 days.

(21) Appl. No.: 18/889,967

(22) Filed: Sep. 19, 2024

(65) Prior Publication Data

US 2025/0014227 A1 Jan. 9, 2025

Related U.S. Application Data

(63) Continuation of application No. PCT/CN2023/082069, filed on Mar. 17, 2023.

(30) Foreign Application Priority Data

Mar. 23, 2022 (CN) ......................... 202210289919.1

(51) Int. Cl.
*G06V 10/00* (2022.01)
*G06T 3/40* (2006.01)
*G06T 9/00* (2006.01)

(52) U.S. Cl.
CPC . *G06T 9/00* (2013.01); *G06T 3/40* (2013.01)

(58) Field of Classification Search
CPC .... H04N 19/182; H04N 19/593; H04N 19/42; H04N 19/44; H04N 19/597; H04N 19/91; G06T 9/00; G06T 3/40
See application file for complete search history.

(56) References Cited

U.S. PATENT DOCUMENTS 8,817,868 B2 * 8/2014 Holcomb ............. H04N 19/117 375/240
9,137,532 B2 * 9/2015 Kim ....................... H04N 19/61
(Continued)

FOREIGN PATENT DOCUMENTS

CN 101883274 B 5/2013
CN 106101731 A 11/2016
(Continued)

OTHER PUBLICATIONS

Wu Jiaji et al: "Lossless Compression of Hyperspectral Imagery via Clustered Differential Pulse Code Modulation with Removal of Local Spectral Outliers", IEEE Signal Processing Letters, Dec. 1, 2015, pp. 2194-2198.
(Continued)

*Primary Examiner* — Amir Alavi
(74) *Attorney, Agent, or Firm* — WOMBLE BOND DICKINSON (US) LLP

(57) ABSTRACT

An image compression method to perform a linear regression operation on a plurality of neighborhood pixel values and pixel values, so as to obtain model parameter values of images in all bands. Compared with a recursion method for calculating the model parameter values, this method can reduce calculation duration, to improve compression efficiency.

14 Claims, 14 Drawing Sheets

(56) References Cited

U.S. PATENT DOCUMENTS

| | | | | |
|---|---|---|---|---|
| 9,883,183 | B2 * | 1/2018 | Chaudhari | H04N 19/129 |
| 10,158,836 | B2 * | 12/2018 | Hsieh | H04N 11/02 |
| 11,509,895 | B2 * | 11/2022 | Kim | H04N 19/176 |
| 11,539,974 | B2 * | 12/2022 | Tourapis | H04N 19/124 |
| 11,902,587 | B2 * | 2/2024 | Choi | H04N 19/46 |
| 2012/0005248 | A1 * | 1/2012 | Garudadri | H03M 7/3062<br>708/207 |
| 2025/0014227 | A1 * | 1/2025 | Sun | G06T 9/00 |

FOREIGN PATENT DOCUMENTS

| | | | |
|---|---|---|---|
| CN | 107770526 | A | 3/2018 |
| CN | 109089118 | A | 12/2018 |
| CN | 107181943 | B | 10/2019 |
| CN | 111385582 | A | 7/2020 |

OTHER PUBLICATIONS

Dua Yaman et al: "Comprehensive review of hyperspectral image compression algorithms", Optical Engineering, Sep. 29, 2020, pp. 1-39.

Santos Lucana et al: "Implementation of CCSDS Standards for Lossless Multispectral and Hyperspectral Satellite Image Compression", IEEE Transactions on Aerospace and Electronic Systems, Jul. 23, 2019, pp. 1120-1138.

* cited by examiner

IMAGE COMPRESSION METHOD, IMAGE DECOMPRESSION METHOD, AND IMAGE PROCESSING APPARATUS

CROSS-REFERENCE TO RELATED APPLICATIONS

This application is a continuation of International Application No. PCT/CN2023/082069, filed on Mar. 17, 2023, which claims priority to Chinese Patent Application No. 202210289919.1, filed on Mar. 23, 2022. The disclosures of the aforementioned applications are hereby incorporated by reference in their entireties.

TECHNICAL FIELD

This application relates to the field of image processing, and in particular, to an image compression method, an image decompression method, and an image processing apparatus.

BACKGROUND

A remote sensing technology is a technology for detection by using a high-altitude multi-spectral image sensor. The remote sensing technology may be used to generate a multi-spectral image. With development of technologies, massive remote sensing image data is generated. An existing air data storage system and ground-to-air transmission bandwidth cannot meet an actual requirement. Therefore, compression of the remote sensing data becomes an important issue.

Currently, there is a dedicated satellite remote sensing data compression method, which is designed by the Consultative Committee for Space Data Systems and referred to as a CCSDS method. According to the method, images in a plurality of bands can be input to an empirical model. After a pixel value of each pixel is predicted based on the empirical model, a pixel residual of each pixel is obtained through calculation. A model parameter value of the empirical model is recursively updated based on the pixel residual, until the pixel residual is less than a preset threshold. Then, entropy encoding is performed on the pixel residual, and a compressed file is generated based on encoded data.

The CCSDS method has a throughput of 10 megabytes per second (MBps) and a compression speed is low, and therefore has limited application scenarios.

SUMMARY

This application provides an image compression method, to perform a linear regression operation on a plurality of neighborhood pixel values and pixel values, so as to obtain model parameter values of images in all bands. Compared with a recursion method for calculating the model parameter values, this method can reduce calculation duration, to improve compression efficiency. This application further provides a corresponding image decompression method and an image processing apparatus.

According to a first aspect, an image compression method is provided. The method includes: obtaining a remote sensing image, and selecting a plurality of pixels from an image in a $p^{th}$ band of the remote sensing image; then, determining a neighborhood vector of each pixel in the image in the $p^{th}$ band based on a compression level identifier and p; generating a pixel value matrix based on neighborhood vectors of the plurality of pixels; next, performing a linear regression operation on the pixel value matrix, a transposed matrix of the pixel value matrix, and pixel values of the plurality of pixels, where a result of the linear regression operation is a model parameter value of the image in the $p^{th}$ band; then, obtaining, through calculation based on the model parameter value of the image in the $p^{th}$ band and the neighborhood vector of each pixel in the image in the $p^{th}$ band, a predicted pixel value of each pixel in the image in the $p^{th}$ band; determining a pixel residual of each pixel in the image in the $p^{th}$ band based on all pixel values of the image in the $p^{th}$ band and all predicted pixel values of the image in the $p^{th}$ band; generating a pixel residual set based on pixel residuals of all pixels in images in all the bands; encoding the pixel residual set to obtain encoded residual data; and generating a compressed file based on the encoded residual data, the compression level identifier, and model parameter values of the images in all the bands. The remote sensing image includes image data in a plurality of bands. A neighborhood vector of one pixel includes a neighborhood pixel value of the pixel and a bias term. The neighborhood pixel value of the pixel includes a pixel value of a current band or a pixel value of an adjacent band. In this way, a model parameter value of one band can be determined based on a pixel value of one or two bands, and no recursive operation is needed. This can increase a speed of calculating the model parameter value, thereby increasing an image compression speed.

In an embodiment, the selecting a plurality of pixel values from an image in a $p^{th}$ band includes: selecting a plurality of pixel grids from the image in the $p^{th}$ band, and selecting one pixel from a same location of each of the plurality of pixel grids, to obtain the plurality of pixels. This provides a method for selecting pixels at an interval.

In another embodiment, the determining a neighborhood vector of each pixel in the image in the $p^{th}$ band based on a compression level identifier and p includes: when p is equal to 1, sequentially selecting target pixels from the image in the $p^{th}$ band, determining, based on the compression level identifier and a location of the target pixel, a first pixel grid in which the target pixel is located, and then determining that neighborhood pixels of the target pixel include another pixel other than the target pixel in the first pixel grid; or when p is greater than 1, sequentially selecting target pixels from the image in the $p^{th}$ band, determining a first pixel grid and a second pixel grid based on the compression level identifier and a location of the target pixel, and then determining that neighborhood pixels of the target pixel include the second pixel grid and another pixel other than the target pixel in the first pixel grid; and generating the neighborhood vector of each pixel based on the neighborhood pixel value of each pixel and the bias term. The neighborhood pixel value is a pixel value of the neighborhood pixel. The first pixel grid and the second pixel grid have a same size, and a location of the first pixel grid in the image in the $p^{th}$ band is the same as a location of the second pixel grid in an image in a $(p-1)^{th}$ band. For a pixel in a first band, neighborhood pixels of the pixel include pixels in the band. For a pixel in another band, neighborhood pixels of the pixel include pixels in two bands. In this way, a method for obtaining the neighborhood pixels and the neighbor vector is provided.

In another embodiment, the compression level identifier is a compression level sequence number, and the compression level sequence number is linearly correlated with a quantity of rows of the first pixel grid. Optionally, the compression level sequence number is linearly positively correlated with the quantity of rows of the first pixel grid. In another optional manner, the compression level sequence number is linearly negatively correlated with the quantity of rows of the first pixel grid.

In another embodiment, the obtaining, through calculation based on the model parameter value of the image in the $p^{th}$ band and the neighborhood vector of each pixel in the image in the $p^{th}$ band, a predicted pixel value of each pixel in the image in the $p^{th}$ band includes: performing a multiplication operation on the model parameter value of the image in the $p^{th}$ band and 2 to a kth power, and rounding a result of the multiplication operation; then, performing a matrix multiplication operation on the neighborhood vector of each pixel in the image in the $p^{th}$ band and a result of the multiplication operation obtained after rounding; and finally, shifting a result of the matrix multiplication operation to the right by k places, to obtain the predicted pixel value of each pixel in the image in the $p^{th}$ band. Herein, k is a positive integer, and k is greater than or equal to a quantity of bits occupied by a decimal place of the pixel value. The quantity of bits occupied by the decimal place of the pixel value may be but is not limited to 8. According to this method, the pixel value can be converted into an integer, and then an integer operation is performed. Compared with that in a floating-point operation, a workload for calculating the predicted pixel value can be reduced according to the foregoing method, thereby increasing a calculation speed.

In another embodiment, the encoding the pixel residual set to obtain encoded residual data includes: selecting, from a preset sequence based on a median of the pixel residual set, a target value greater than the median, and then determining that a target difference is equal to the target value minus the median; performing an addition operation on each pixel residual in the pixel residual set and the target difference; then, dividing each result of the addition operation into a high-order byte part and a low-order byte part; next, encoding low-order byte parts of all results of addition operations into encoded low-order byte residual data by using a finite state entropy encoding algorithm; encoding high-order byte parts of all results of the addition operations into encoded high-order byte residual data by using the finite state entropy encoding algorithm; and forming the encoded residual data based on the encoded low-order byte residual data and the encoded high-order byte residual data. Each value in the preset sequence is an odd multiple of 128. In this way, a center of a distribution of residuals can be translated from the median to an odd multiple of 128. When the high-order byte part and the low-order byte part each occupy one byte, because entropy of same high-order byte parts is lower than that of different high-order byte parts, a compression rate can be improved when finite state entropy encoding is performed on the high-order byte part.

According to a second aspect, an image decompression method is provided. The method includes: obtaining a compressed file, and then obtaining encoded residual data, a compression level identifier, and model parameter values of images in all bands from the compressed file based on a decompression instruction; decoding the encoded residual data into a pixel residual set; then, selecting a to-be-processed pixel based on a band sequence and a pixel sequence; obtaining a neighborhood vector of the to-be-processed pixel based on the compression level identifier and a band sequence number of the to-be-processed pixel; determining a predicted pixel value of the to-be-processed pixel based on the neighborhood vector of the to-be-processed pixel and a model parameter value of an image in a $p^{th}$ band; next, determining a pixel value of the to-be-processed pixel based on the predicted pixel value of the to-be-processed pixel and a pixel residual of the to-be-processed pixel; and then, generating a remote sensing image based on pixel values of the images in all the bands. The neighborhood vector includes a neighborhood pixel value and a bias term. According to the image decompression method, pixels can be restored based on a prediction result of a model and the pixel residual, to provide a lossless decompression method.

In an embodiment, the decoding the encoded residual data into a pixel residual set includes: dividing the encoded residual data into encoded high-order byte residual data and encoded low-order byte residual data, and then decoding the encoded high-order byte residual data into a high-order byte part set by using a finite state entropy encoding algorithm; decoding the encoded low-order byte residual data into a low-order byte part set by using the finite state entropy encoding algorithm; then, generating a target value set based on the high-order byte part set and the low-order byte part set; and subtracting a target difference from each value in the target value set to obtain the pixel residual set. A sum of a median of the pixel residual set and the target difference is an odd multiple of 128. For the pixel residual added with the target difference, an actual pixel residual can be restored according to the method.

According to a third aspect, an image processing apparatus is provided, and may have a function of implementing the image compression method according to the first aspect. The function may be implemented by hardware, or may be implemented by hardware executing corresponding software. The hardware or the software includes one or more modules corresponding to the function.

According to a fourth aspect, an image processing apparatus is provided, and may have a function of implementing the image decompression method according to the second aspect. The function may be implemented by hardware, or may be implemented by hardware executing corresponding software. The hardware or the software includes one or more modules corresponding to the function.

According to a fifth aspect, an image processing apparatus is provided, including a processor and a memory. The memory is configured to store a program. The processor executes the program to implement the methods according to the foregoing aspects and the possible implementations of the foregoing aspects.

According to a sixth aspect, a computer-readable storage medium is provided. The computer-readable storage medium stores instructions. When the instructions are run on a computer, the computer is enabled to perform the methods according to the foregoing aspects.

According to a seventh aspect, a computer program product including instructions is provided. When the computer program product runs on a computer, the computer is enabled to perform the methods according to the foregoing aspects.

According to an eighth aspect, a chip system is provided, including at least one processor. The processor is coupled to a memory. The memory is configured to store a computer program or instructions. The processor is configured to execute the computer program or the instructions, to implement the methods according to the foregoing aspects.

DESCRIPTION OF EMBODIMENTS

An image compression method and an image decompression method in this application may be applied to a scenario including a remote sensing image, for example, weather prediction, geological exploration, or ground mapping.

Figure 1:
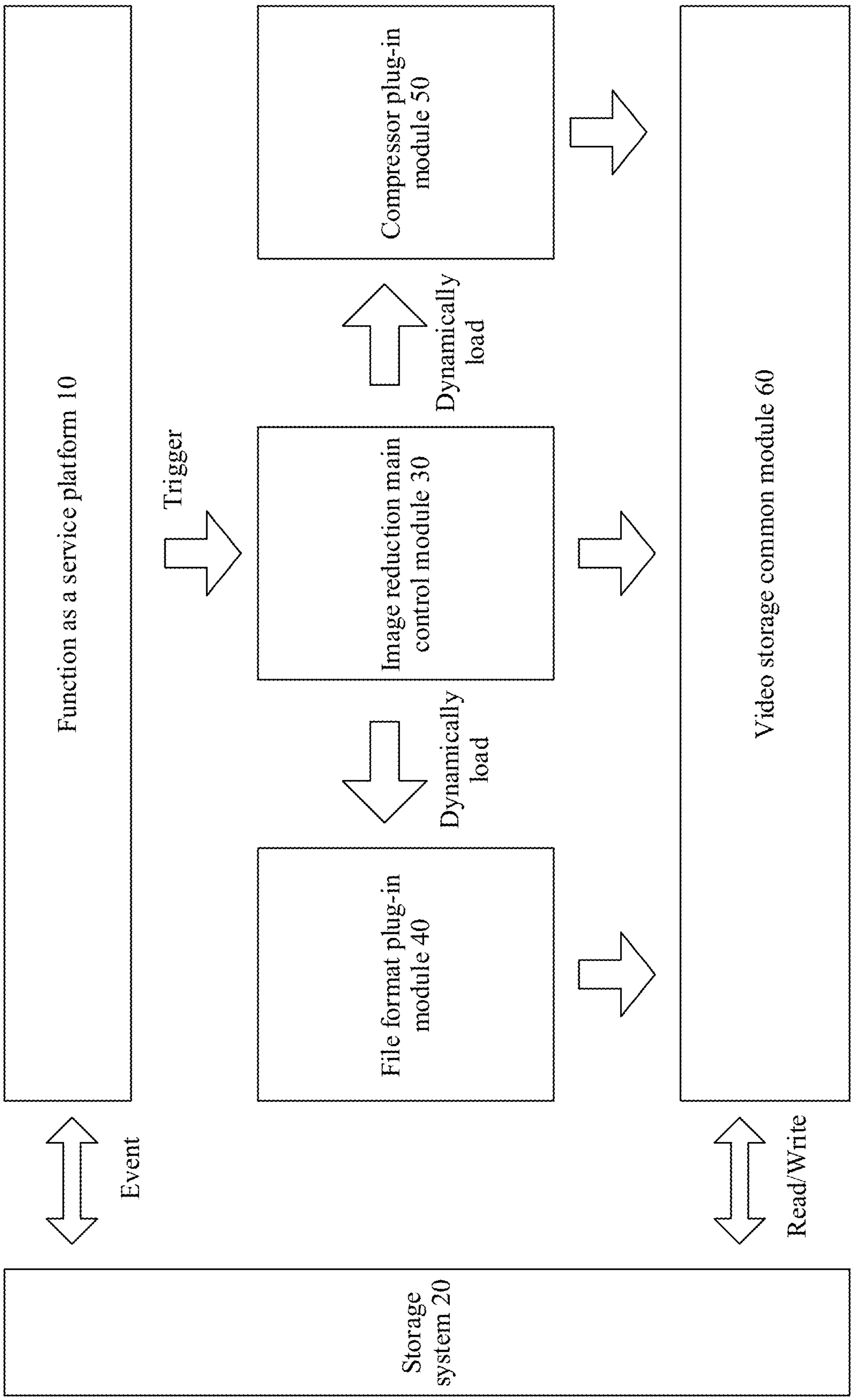
FIG. 1 is a schematic diagram of an image processing system according to an embodiment of this application.

With reference to FIG. 1, in an embodiment, an image processing system in this application includes a function as a service (FaaS) platform 10, a storage system 20, an image reduction main control module 30, a file format plug-in module 40, a compressor plug-in module 50, a video storage common module 60, and the like.

The function as a service platform 10 may perform a corresponding function based on an operation instruction input by a user. The operation instruction may be but is not limited to a creation instruction, a read instruction, an update instruction, or a deletion instruction.

The storage system 20 may be but is not limited to a distributed storage system.

The image reduction main control module 30 may include functional modules such as a command line service, a FaaS service, dynamic plug-in loading, task execution, KPI statistics collection, index serialization, and multi-thread concurrency.

The compressor plug-in module 30 includes a Fractal-CM plug-in, an HZRA plug-in, a Fractal RS plug-in, a deflate plug-in, a bz2 plug-in, a WebP plug-in, a zstd plug-in, an LZW plug-in, a JPEG-LS plug-in, a JPEG XL plug-in, a ImageMagick plug-in, a JPEG2000 plug-in, a FLIF plug-in, a CCSDS plug-in, an fpzip plug-in, and the like.

The file format plug-in module 40 may perform file format conversion. The file format plug-in module 40 may be but is not limited to an MRC file format plug-in, a tag image file format (TIFF) plug-in, or a raw (RAW) file format plug-in. The MRC file format plug-in can convert an image in another format into an image in an MRC format. The MRC file format is a common data file format in the field of electronic microscope imaging. Both the MRC file format plug-in and TIFF file format plug-in may include functions such as metadata parsing, file block division, and multi-frame aggregation. The RAW file format plug-in may include metadata parsing, file block division, and multi-channel aggregation functions.

The video storage common module 60 includes an interface class, a tool class, a data preprocessing class, a third-party library, and the like. The interface class includes a file format interface and a compressor interface. The tool class includes a thread pool, I/O read/write, a log, a timer, and the like. The data preprocessing class includes bit depth division, channel division, big-endian and little-endian conversion, band sequential (BSQ) format conversion, band interleaved by pixel (BIP) conversion, multi-channel redundancy removal, and the like. The third-party library includes data serialization, a log, JSON parsing, general compression (such as zlib or zstd), and image compression (such as charls/WebP/JPEG XL).

In an example, after the user logs in to the function as a service platform 10, the function as a service platform 10 may be triggered to obtain an event of a satellite remote sensing image from the storage system 20, and may read the satellite remote sensing image from the storage system 20 based on the event. The satellite remote sensing image may be input to the image reduction main control module 30. The dynamic loading file format plug-in module 40 may dynamically load the satellite remote sensing image from the image reduction main control module 30, and perform image format conversion on the satellite remote sensing image. The compressor plug-in module 30 may dynamically load the satellite remote sensing image from the image reduction main control module 30, and may compress the satellite remote sensing image. The video storage common module 60 may store a satellite remote sensing image uploaded by the user, an image in a converted format, or a compressed file. The video storage common module 60 may store the stored image or file in the storage system 20, or read data from the storage system 20.

Figure 2:
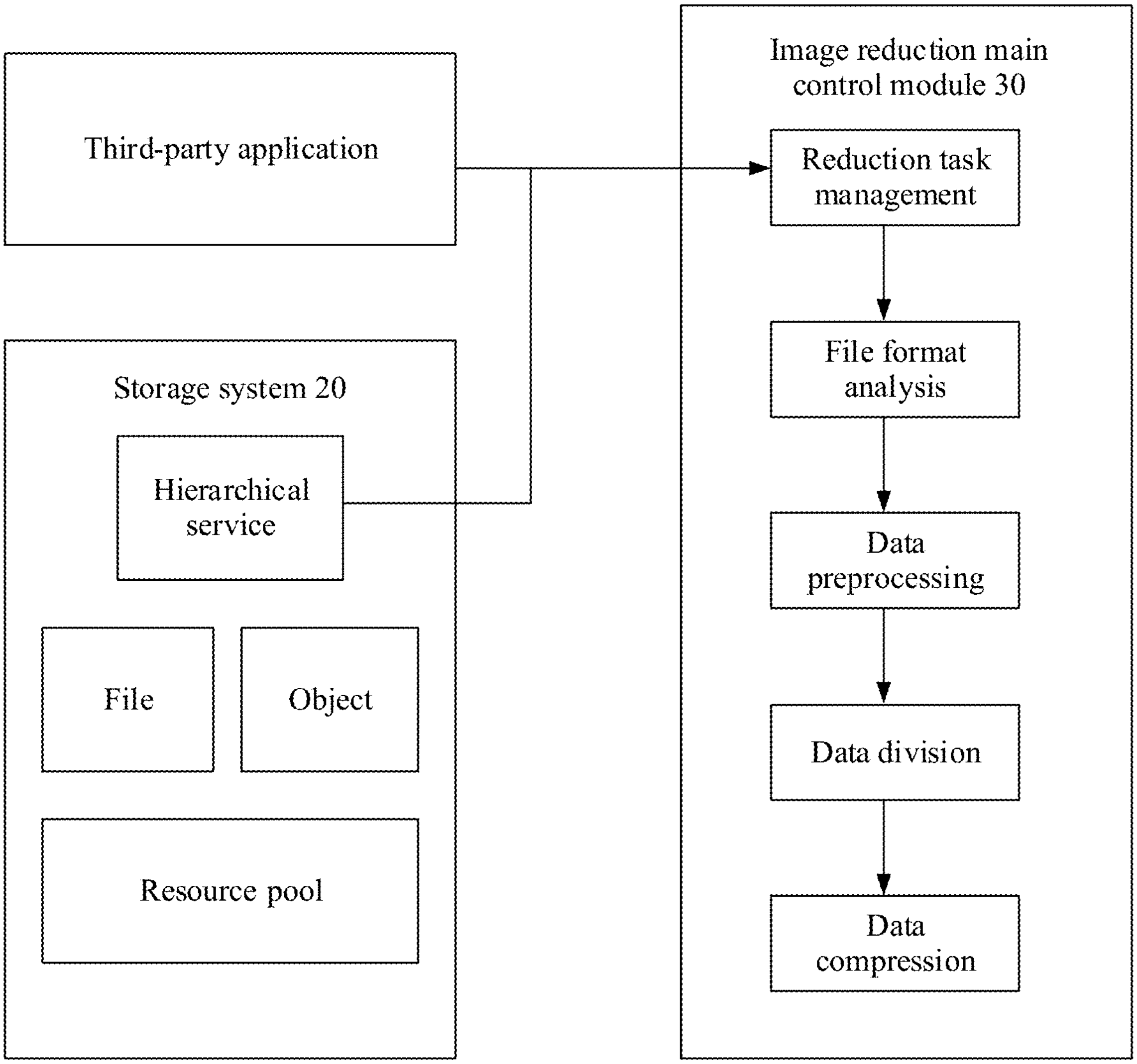
FIG. 2 is a schematic diagram of an image compression process according to an embodiment of this application.

The following describes an image compression process in this application based on the image processing system shown in FIG. 1. With reference to FIG. 2, after obtaining a satellite remote sensing image from the storage system 20 by using a third-party application program, the user inputs the satellite remote sensing image to the image reduction main control module 30. The image reduction main control module 30 includes a reduction task management unit, a file format analysis unit, a data preprocessing unit, a data division unit, and a data compression unit. The satellite remote sensing image is processed by the reduction task management unit, the file format analysis unit, the data preprocessing unit, the data division unit, and the data compression unit, and then a compressed file is generated. The image reduction main control module 30 may further include but is not limited to a resource scheduling unit, a plug-in management unit, or a product-oriented non-functional attribute design (DFX).

Figure 3:
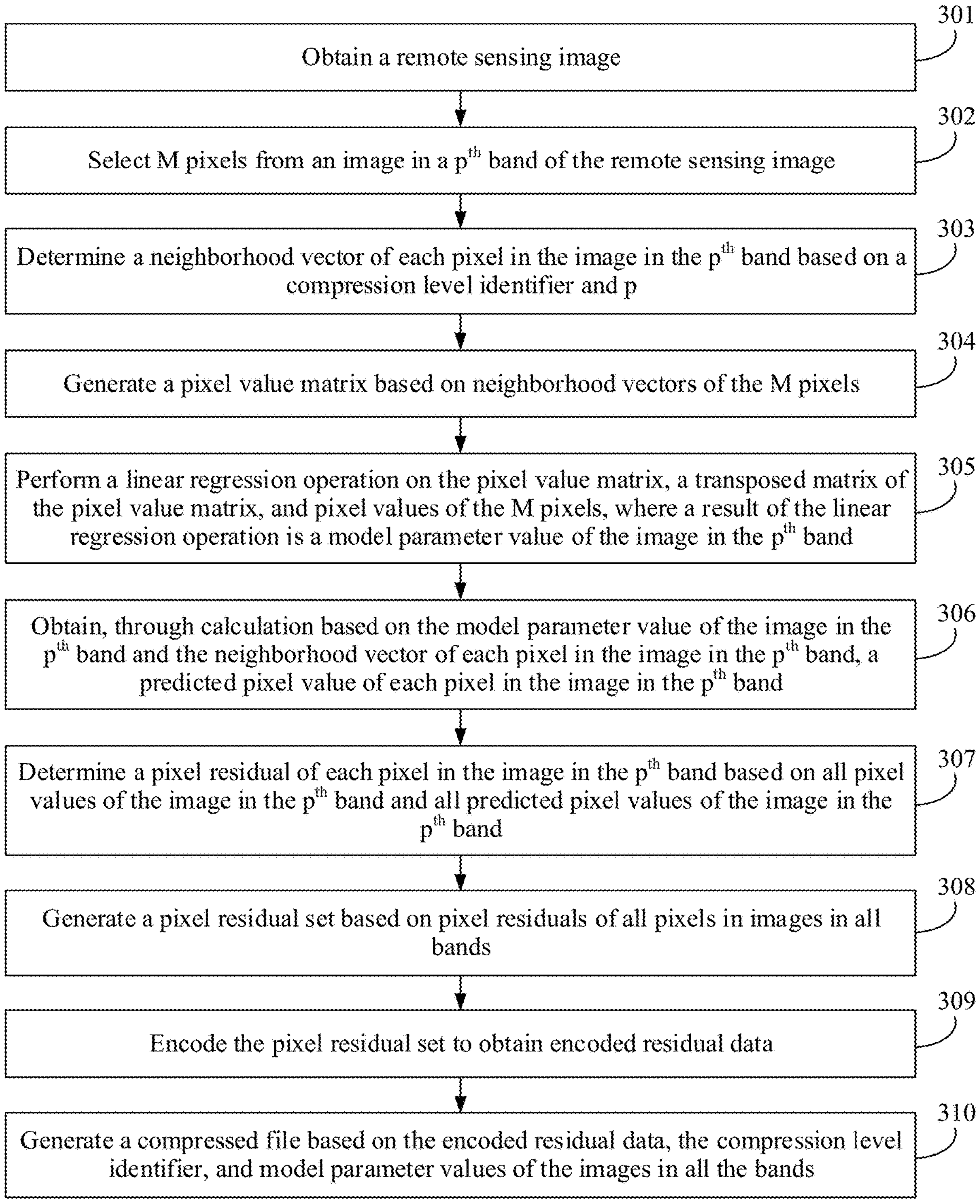
FIG. 3 is a flowchart of an image compression method according to an embodiment of this application.

Because an empirical model of an existing CCSDS method is generated based on a historical remote sensing image, when processing a new remote sensing image, the empirical model needs to update a model parameter value by using a recursive method, so that a pixel residual is not higher than a preset threshold. However, the recursive method has many operations, resulting in low efficiency of updating the empirical model. Therefore, this application provides an image compression method with a higher compression speed. With reference to FIG. 3, an embodiment of the image compression method in this application includes the following operations.

Operation 301: Obtain a remote sensing image. The remote sensing image may be an image in a BSQ format, a BIP format, or a band interleaved by line (BIL) format. The remote sensing image includes images in P bands, where P is a positive integer. Herein, p is a variable and $p \in [1, P]$. The remote sensing image may be a space remote sensing image, an aerial remote sensing image (for example, a satellite remote sensing image), or a ground remote sensing image.

Operation 302: Select M pixels from an image in a $p^{th}$ band of the remote sensing image, where M is a positive integer.

Operation 303: Determine a neighborhood vector of each pixel in the image in the $p^{th}$ band based on a compression level identifier and p.

In an example, when the compression level identifier is 1 and p=1, neighborhood pixels of $$P_{i,j}^{p}$$

include $$P_{i-1,j-1}^{p},\ P_{i-1,j}^{p},$$

and $$P_{i,j-1}^{p}.$$

When the compression level identifier is 1 and p>1, neighborhood pixels of $$P_{i,j}^{p}$$

are determined to include $$P_{i-1,j-1}^{p},\ P_{i-1,j}^{p},\ P_{i,j-1}^{p},\ P_{i-1,j-1}^{p-1},\ P_{i-1,j}^{p-1},\ P_{i,j-1}^{p-1},$$

and $$P_{i,j}^{p-1}.\ P_{i,j}^{p}$$

indicates a pixel in an $i^{th}$ row and a $j^{th}$ column in the $p^{th}$ band, $$P_{i,j}^{p-1}$$

indicates a pixel in an $i^{th}$ row and a $j^{th}$ column in a $(p-1)^{th}$ band, and another pixel may be deduced by analogy.

In another example, when the compression level identifier is 2 and p=1, a quantity of neighborhood pixels is 15. When the compression level identifier is 2 and p>1, a quantity of neighborhood pixels is 31. A neighborhood pixel of a target pixel belongs to an image in a band in which the target pixel is located or an image in a previous band, and a distance value between the neighborhood pixel and the target pixel is less than a preset distance value. For each pixel, a neighborhood vector may be generated based on a pixel value of a neighborhood pixel and a bias term.

Operation 304: Generate a pixel value matrix based on neighborhood vectors of the M pixels.

Optionally, the pixel value matrix A may be:

$$\begin{bmatrix} P'_{1,1} & \cdots & P'_{1,N} & 1 \\ \cdots & \cdots & \cdots & \cdots \\ P'_{M,1} & \cdots & P'_{M,N} & 1 \end{bmatrix}$$

N is a quantity of neighborhood pixels corresponding to one pixel.

$$P'_{i,j}$$

indicates a $j^{th}$ neighborhood pixel value of an $i^{th}$ pixel.

$$[P'_{1,1}\ \cdots\ P'_{1,N}\ \ 1]$$

is a neighborhood vector of a $1^{st}$ pixel in the M pixels.

$$[P'_{M,1}\ \cdots\ P'_{M,N}\ \ 1]$$

is a neighborhood vector of an $M^{th}$ pixel in the M pixels. A neighborhood vector of another pixel may be deduced by analogy.

Operation 305: Perform a linear regression operation on the pixel value matrix, a transposed matrix of the pixel value matrix, and pixel values of the M pixels, where a result of the linear regression operation is a model parameter value of the image in the $p^{th}$ band.

After the pixel value matrix A is generated, the transposed matrix $A^T$ of the pixel value matrix A is obtained through calculation based on the pixel value matrix, and then the linear regression operation is performed according to a formula. The formula is $AA^Tx=A^Tb$. Herein, b includes the pixel values of the M pixels. x is the model parameter value of the image in the $p^{th}$ band, namely, a vector formed by a plurality of coefficients. A method of the linear regression operation may be a Cholesky decomposition method.

Operation 306: Obtain, through calculation based on the model parameter value of the image in the $p^{th}$ band and the neighborhood vector of each pixel in the image in the $p^{th}$ band, a predicted pixel value of each pixel in the image in the $p^{th}$ band.

Both the linear regression operation and the matrix operation in operation 305 and operation 306 include a large quantity of addition operation instructions and multiplication operation instructions. In this application, for an independent multiplication operation instruction and an independent addition operation instruction, a single instruction multiple data (SIMD) instruction may be used, so that the instructions are processed in parallel. This increases an operation speed.

Operation 307: Determine a pixel residual of each pixel in the image in the $p^{th}$ band based on all pixel values of the image in the $p^{th}$ band and all predicted pixel values of the image in the $p^{th}$ band.

Figure 4:
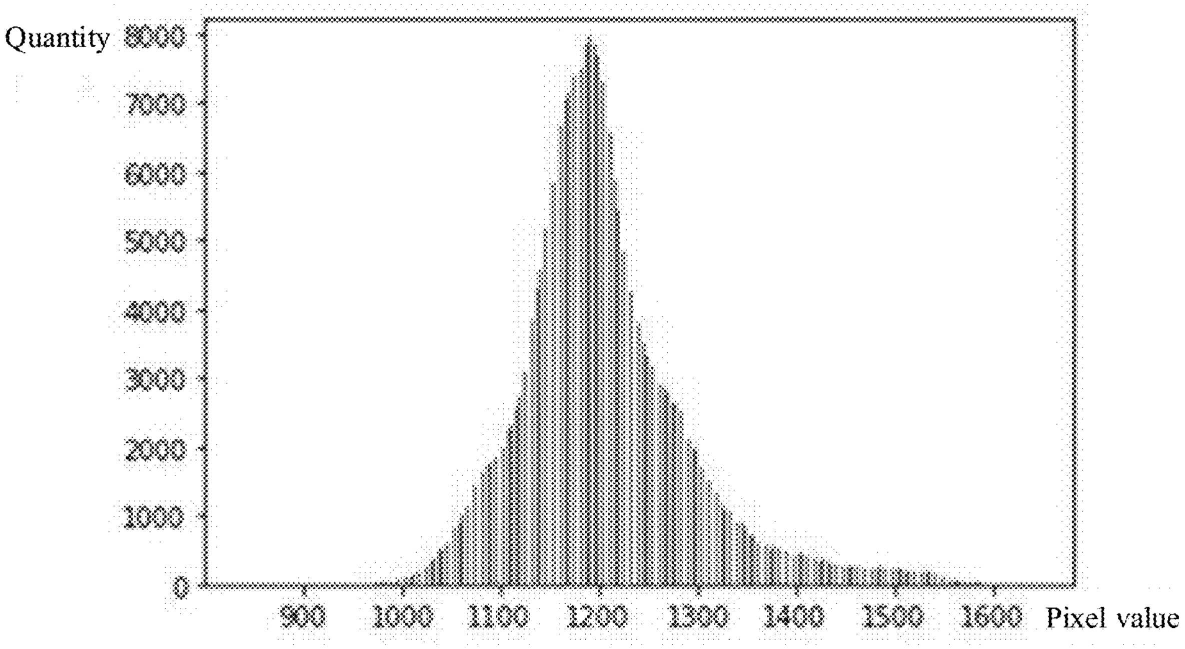
FIG. 4 is a histogram of a distribution of pixel values of a band according to an embodiment of this application.
Figure 5:
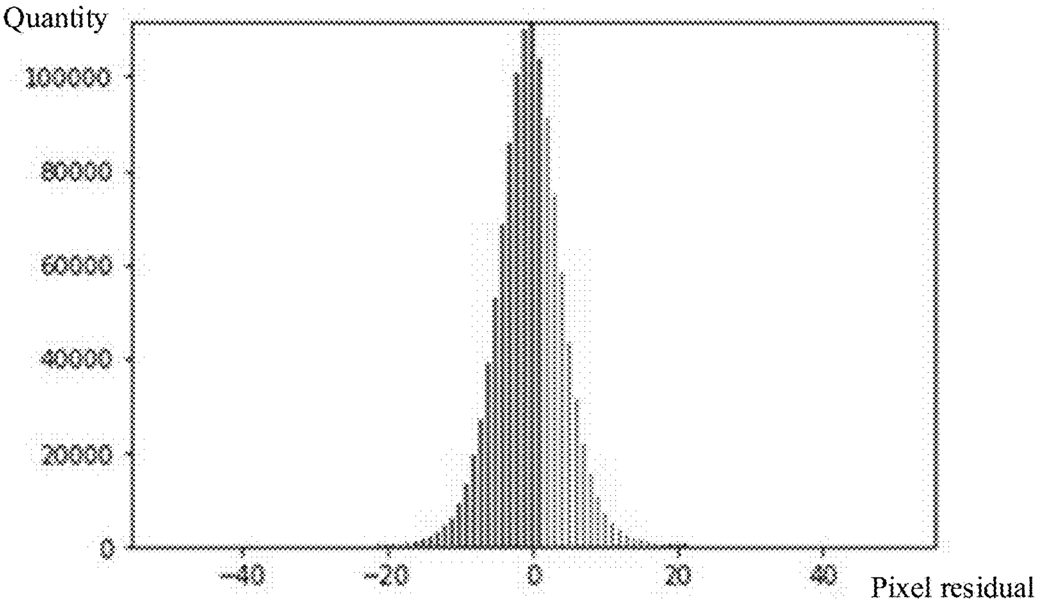
FIG. 5 is a histogram of a distribution of pixel residuals of a band according to an embodiment of this application.

The following describes a distribution of pixel values and a distribution of pixel residuals. FIG. 4 is a histogram of a distribution of pixel values of a band, where a horizontal axis indicates a pixel value, and a vertical axis indicates a quantity of pixel values. FIG. 5 is a histogram of a distribution of pixel residuals of the pixel values shown in FIG. 4, where a horizontal axis indicates a pixel residual, and a vertical axis indicates a quantity of pixel residuals. With reference to FIG. 4 and FIG. 5, the pixel values are basically [1000, 1600], and the pixel residuals are basically [−20, 20]. It can be learned from FIG. 4 and FIG. 5 that the distribution of the pixel residuals is more centralized than the distribution of the pixel values. Therefore, zero-order entropy is lower, and a compression rate is higher. The compression rate in this application is equal to a data volume before compression divided by a data volume after compression.

Operation 308: Generate a pixel residual set based on pixel residuals of all pixels in the images in all the bands.

Operation 309: Encode the pixel residual set to obtain encoded residual data.

Operation 310: Generate a compressed file based on the encoded residual data, the compression level identifier, and model parameter values of the images in all the bands. In an optional embodiment, a header of the compressed file includes the compression level identifier and model parameter values of the images in all the bands, and the encoded residual data is stored in other data space of the compressed file. It should be noted that the header of the compressed file may further include but is not limited to a format of the remote sensing image.

In this embodiment, the linear regression operation is performed on pixels in one to two bands of the remote sensing image to obtain the model parameter value of a linear regression model. In this way, a recursive operation is not needed, and image compression efficiency can be improved.

In addition, because the pixels in this embodiment are adapted to the model, an effect of lossless compression can be achieved.

Optionally, operation 302 includes: dividing the image in the $p^{th}$ band into M pixel grids, and selecting one pixel from a same location of each of the M pixel grids to obtain the M pixels. Optionally, any two of the M pixel grids do not overlap.

In an example, the pixel grid includes four pixels, and locations of the four pixels are respectively denoted as (i, j), (i+1, j), (i, j+1), and (i+1, j+1). The M pixels may be obtained by selecting one pixel from a same location of each of the M pixel grids. For example, one pixel is selected from the $(i+1, j+1)^{th}$ location of each of the M pixel grids, to obtain the M pixels.

In some other examples, the pixel grid includes 9 pixels or 16 pixels. A quantity of pixels in the pixel grid is not limited in this application, and may be specifically selected based on an actual situation. In this application, sampling may alternatively be performed at an interval in another manner. For example, one of two pixels is selected, or one of three pixels is selected. This may be specifically set based on an actual situation, and is not limited in this application.

In an optional embodiment, operation 303 includes: when p is equal to 1, sequentially selecting target pixels from the image in the $p^{th}$ band, determining, based on the compression level identifier and a location of the target pixel, a first pixel grid in which the target pixel is located, and determining that neighborhood pixels of the target pixel include another pixel in the first pixel grid in which the target pixel is located other than the target pixel; or when p is greater than 1, sequentially selecting target pixels from the image in the $p^{th}$ band, determining, based on the compression level identifier and a location of the target pixel, a first pixel grid and a second pixel grid that is in an image in the $(p-1)^{th}$ band, and determining that neighborhood pixels of the target pixel include the second pixel grid and another pixel other than the target pixel in the first pixel grid.

The first pixel grid and the second pixel grid have a same size, and a location of the first pixel grid in the image in the $p^{th}$ band is the same as a location of the second pixel grid in the image in the $(p-1)^{th}$ band. The target pixel is a pixel selected in the $p^{th}$ band.

Optionally, the compression level identifier is a compression level sequence number, and the compression level sequence number is linearly correlated with a quantity of rows of the first pixel grid.

In an example, the compression level sequence number is linearly positively correlated with a quantity of rows of the first pixel grid. A relationship among the compression level sequence number, the quantity of rows of the first pixel grid, and a quantity of rows of the second pixel grid may be shown in Table 1.

TABLE 1

| Compression level sequence number | Quantity of the rows of the first pixel grid | Quantity of the rows of the second pixel grid |
|---|---|---|
| 1 | 2 | 2 |
| 2 | 3 | 3 |
| 3 | 4 | 4 |
| 4 | 5 | 5 |

It should be understood that the compression level sequence number and the quantity of rows of the first pixel grid are not limited to the example in Table 1, and may be specifically set based on an actual situation. In some other embodiments, the compression level sequence number is linearly negatively correlated with the quantity of rows of the first pixel grid.

Optionally, when the compression level identifier is 1, each pixel grid includes four pixels.

Figure 6:
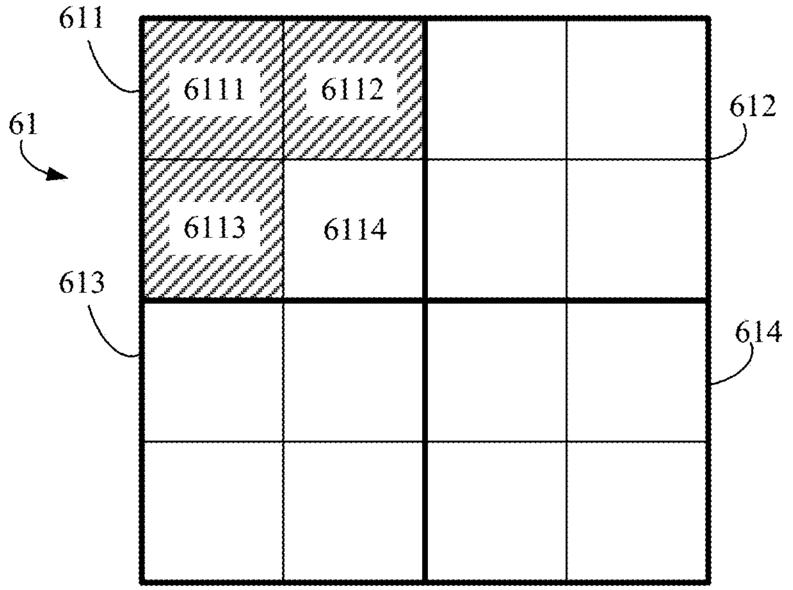
FIG. 6 is a schematic diagram of a pixel and neighborhood pixels in a $1^{st}$ band according to an embodiment of this application.

With reference to FIG. 6, an image 61 in a $1^{st}$ band includes a pixel grid 611, a pixel grid 612, a pixel grid 613, and a pixel grid 614. The pixel grid 611 includes a pixel 6111, a pixel 6112, a pixel 6113, and a pixel 6114. Neighborhood pixels of the pixel 6114 include the pixel 6111, the pixel 6112, and the pixel 6113. It should be understood that the image 61 in the $1^{st}$ band further includes another pixel grid that is not shown. In the image 61, neighborhood pixels in another pixel grid are similar to the neighborhood pixels in the pixel grid 61.

For pixels in a $1^{st}$ row of the image in the $1^{st}$ band, several pixels whose pixel values are 0 may be set as neighborhood pixels of the pixels, to construct a pixel grid corresponding to the pixels. For example, neighborhood pixels of the pixel 6111 include three pixels whose pixel values are 0. Neighborhood pixels of the pixel 6112 include the pixel 6111 and two pixels whose pixel values are 0. Another pixel in the $1^{st}$ row may be deduced by analogy.

Figure 7:
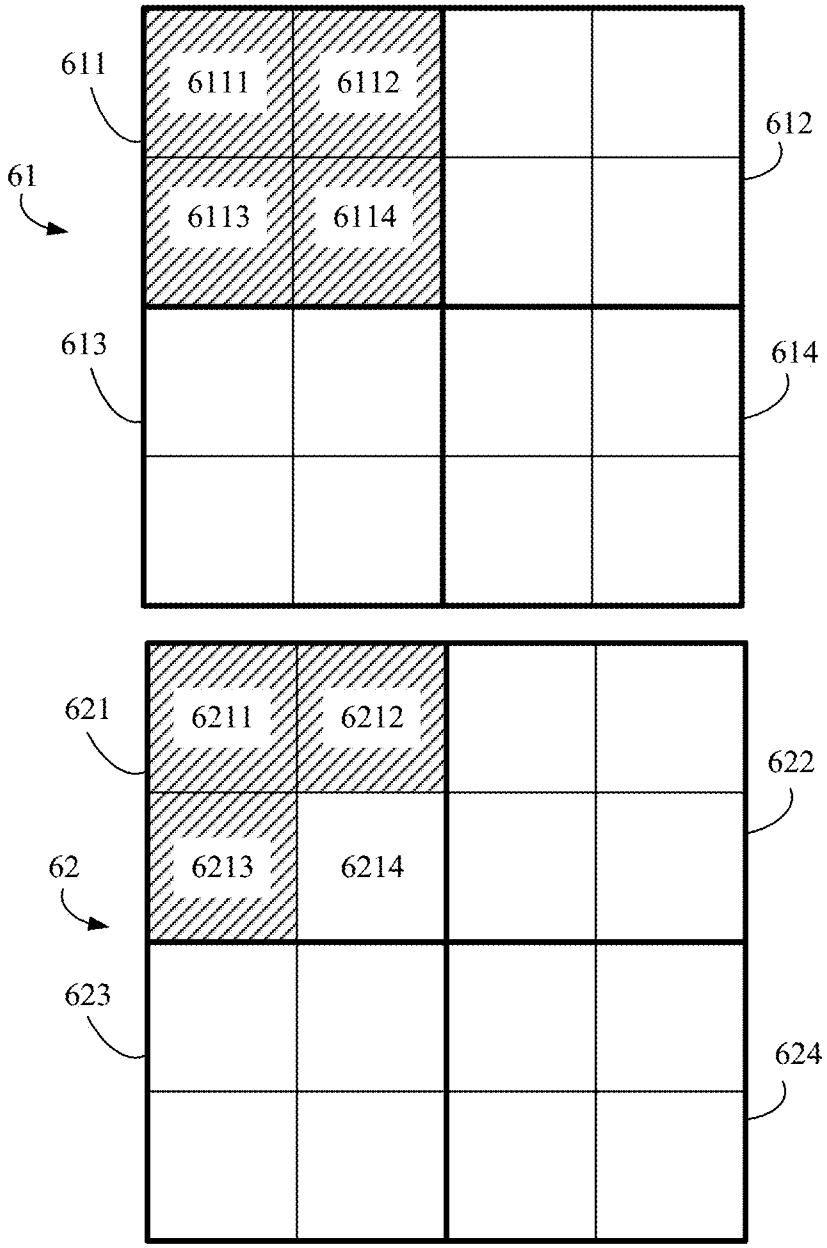
FIG. 7 is a schematic diagram of a pixel and neighborhood pixels in a $2^{nd}$ band according to an embodiment of this application.

With reference to FIG. 7, an image 61 in a $1^{st}$ band includes a pixel grid 611, a pixel grid 612, a pixel grid 613, and a pixel grid 614. An image 62 in a $2^{nd}$ band includes a pixel grid 621, a pixel grid 622, a pixel grid 623, and a pixel grid 624. The pixel grid 621 includes a pixel 6211, a pixel 6212, a pixel 6213, and a pixel 6214. Neighborhood pixels of the pixel 6214 include the pixel 6211, the pixel 6212, the pixel 6213, a pixel 6111, a pixel 6112, a pixel 6113, and a pixel 6114. By analogy, neighborhood pixels of a pixel in another pixel grid may be determined. Neighborhood pixels in a subsequent band (for example, a $3^{rd}$ band) are similar to the neighborhood pixels in the $2^{nd}$ band. For a pixel in a $1^{st}$ row of an image in another band, a pixel grid of the pixel is similar to the pixel grid of the pixel in the $1^{st}$ row of the $1^{st}$ band.

matrix multiplication operation to the right by k places, to obtain the predicted pixel value of each pixel in the image in the $p^{th}$ band.

In this embodiment, because the model parameter value of the image in the $p^{th}$ band calculated in operation 306 is a floating-point number, in this application, the multiplication operation can be performed on the model parameter value and 2 to the kth power, and an amplified model parameter value can be obtained by rounding the result of the multiplication operation. When k=8, a model parameter value x and an amplified model parameter value x' of an image in a band are shown in Table 2.

TABLE 2

| | | | | | | | | |
|---|---|---|---|---|---|---|---|---|
| x | −0.0660 | 0.1116 | −0.2887 | 0.2433 | 0.0757 | 0.0995 | 0.0410 | −0.1433 |
| x' | −68 | 114 | −296 | 249 | 78 | 102 | 42 | −147 |

In another optional manner, when the compression level identifier is 2, each pixel grid includes 16 pixels.

Figure 8:
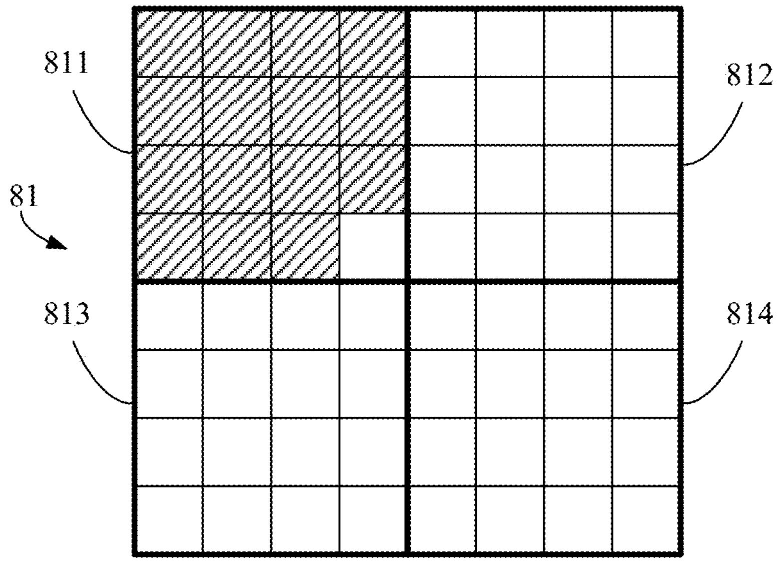
FIG. 8 is another schematic diagram of a pixel and neighborhood pixels in a $1^{st}$ band according to an embodiment of this application.

With reference to FIG. 8, an image 81 in a $1^{st}$ band includes a pixel grid 811, a pixel grid 812, a pixel grid 813, and a pixel grid 814. The pixel grid 811 includes 16 pixels, and neighborhood pixels of a $16^{th}$ pixel include the remaining 15 pixels in the pixel grid 811. It should be understood that the image 81 in the 1st band further includes another pixel grid that is not shown.

For pixels in a $1^{st}$ row to a $3^{rd}$ row, several pixels whose pixel values are 0 may be set as neighborhood pixels of the pixels, to construct a pixel grid corresponding to the pixels. For example, neighborhood pixels of a $1^{st}$ pixel in the pixel grid 811 may include 15 pixels whose pixel values are 0. Neighborhood pixels of a $2^{nd}$ pixel in the pixel grid 811 may include the 1st pixel and 14 pixels whose pixel values are 0. Another pixel may be deduced by analogy.

Figure 9:
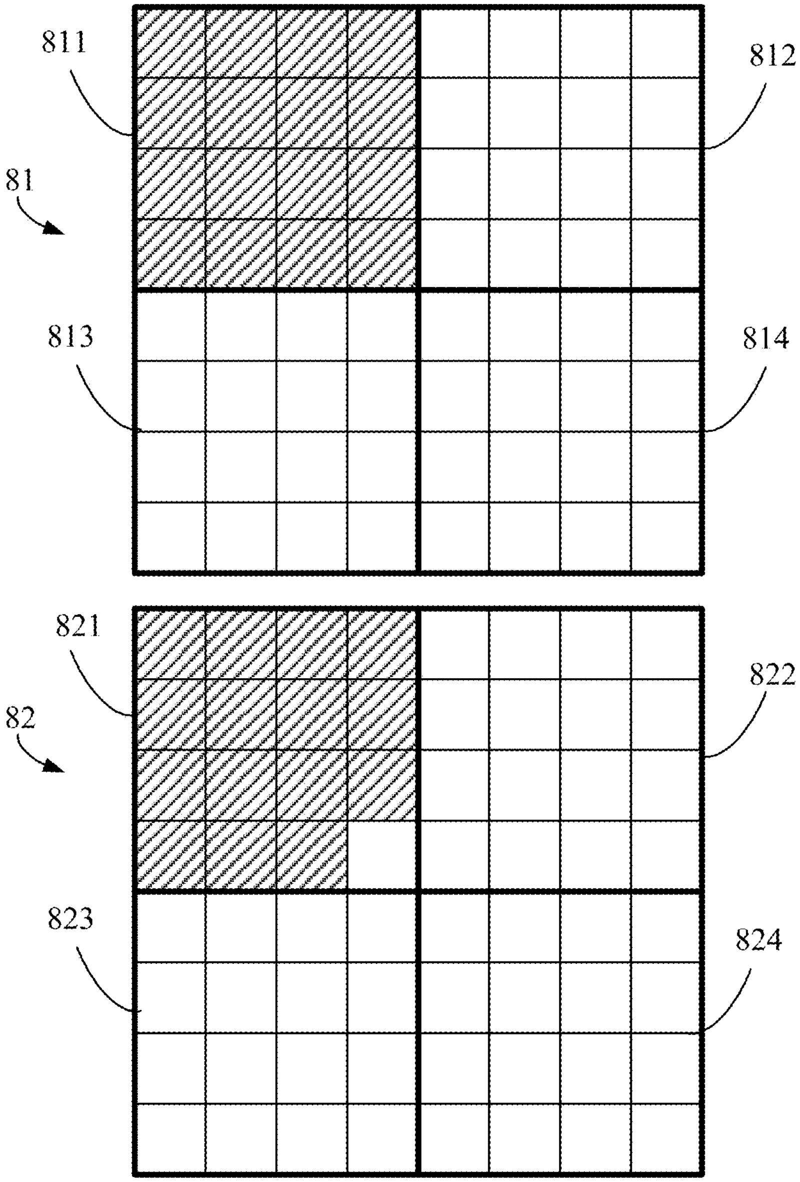
FIG. 9 is another schematic diagram of a pixel and neighborhood pixels in a $2^{nd}$ band according to an embodiment of this application.

With reference to FIG. 9, an image 81 in a $1^{st}$ band includes a pixel grid 811, a pixel grid 812, a pixel grid 813, and a pixel grid 814, and an image 82 in a $2^{nd}$ band includes a pixel grid 821, a pixel grid 822, a pixel grid 823, and a pixel grid 824. Neighborhood pixels of a $16^{th}$ pixel in the pixel grid 821 include all pixels in the pixel grid 811 and first 15 pixels in the pixel grid 821. It should be understood that, in the image 82 in the $2^{nd}$ band, neighborhood pixels in another pixel grid are similar to the neighborhood pixels in the pixel grid 81. In an image in a subsequent band (for example, an image in a $3^{rd}$ band), neighborhood pixels in a pixel grid are similar to the neighborhood pixels in the pixel grid 81. For pixels in a $1^{st}$ row to a $3^{rd}$ row in an image in another band, a pixel grid of the pixels is similar to the pixel grid of the pixels in the 1st row to the $3^{rd}$ row in the 1st band.

In an optional embodiment, operation 306 includes: performing a matrix multiplication operation on the model parameter value of the image in the $p^{th}$ band and the neighborhood vector of each pixel, to obtain the predicted pixel value of each pixel in the image in the $p^{th}$ band.

The model parameter value is usually a floating-point number, and a floating-point operation requires high computing overheads. This application can provide a method to reduce the computing overheads. In another optional embodiment, operation 306 includes: performing a multiplication operation on the model parameter value of the image in the $p^{th}$ band and 2 to a $k^{th}$ power; rounding a result of the multiplication operation; performing a matrix multiplication operation on the neighborhood vector of each pixel in the image in the $p^{th}$ band and a result of the multiplication operation obtained after rounding; and shifting a result of the matrix multiplication operation to the right by k places.

In the foregoing process, the floating-point number may be converted into an integer. In this way, integer multiplication is performed when the matrix multiplication operation is performed, and a floating-point operation does not need to be performed. Therefore, a calculation amount can be reduced, and a speed of calculating the predicted pixel value can be increased. A result of the matrix multiplication operation is an amplified predicted pixel value. The predicted pixel value can be obtained by shifting the result of the matrix multiplication operation to the right by k places. It should be understood that, after the result of the matrix multiplication operation is shifted to the right by the k places, rounding may be further performed, and a value obtained after rounding is used as the predicted pixel value. Herein, k is a positive integer, and k is greater than or equal to a quantity of bits occupied by a decimal place of the pixel value. A byte occupied by the decimal place of the pixel value may be but is not limited to one byte.

In an optional embodiment, operation 308 includes: dividing each pixel residual in the pixel residual set into a high-order byte part and a low-order byte part; encoding low-order byte parts of all results of addition operations into encoded low-order byte residual data by using a finite state entropy encoding algorithm; encoding high-order byte parts of all results of the addition operations into encoded high-order byte residual data by using the finite state entropy encoding algorithm; and forming the encoded residual data based on the encoded low-order byte residual data and the encoded high-order byte residual data.

In some embodiments, the finite state entropy encoding algorithm can process only one byte. According to the method in this embodiment, a 2-byte pixel residual can be encoded. A method for encoding a pixel residual of more bytes may be deduced by analogy.

Figure 10:
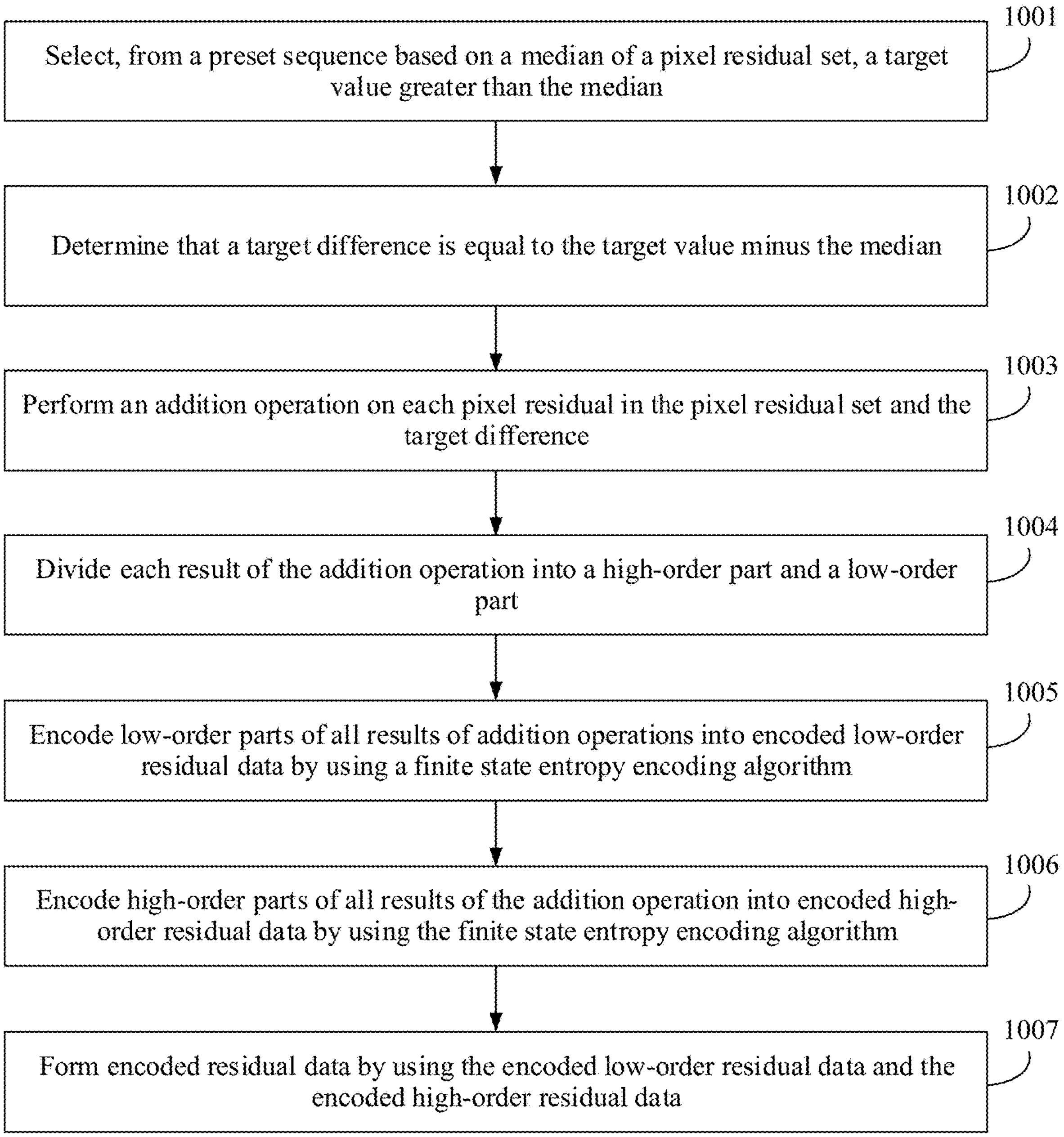
FIG. 10 is a flowchart of a residual encoding method according to an embodiment of this application.

During division into the high-order and the low-order bytes, high-order byte parts of residuals of different pixels may be different, and therefore entropy exists. This application provides a method to reduce entropy, so as to improve a compression rate. With reference to FIG. 10, in another optional embodiment, operation 308 includes the following operations.

Operation 1001: Select, from a preset sequence based on a median of the pixel residual set, a target value greater than the median.

Operation 1002: Determine that a target difference is equal to the target value minus the median.

Operation 1003: Perform an addition operation on each pixel residual in the pixel residual set and the target difference.

Operation 1004: Divide each result of the addition operation into a high-order byte part and a low-order byte part.

Operation 1005: Encode low-order byte parts of all results of addition operations into encoded low-order byte residual data by using a finite state entropy encoding algorithm.

Operation 1006: Encode high-order byte parts of all results of the addition operations into encoded high-order byte residual data by using the finite state entropy encoding algorithm.

It should be understood that operation 1006 may be performed before operation 1005, or operation 1005 and operation 1006 may be performed in parallel.

Operation 1007: Form the encoded residual data based on the encoded low-order byte residual data and the encoded high-order byte residual data.

In this embodiment, each value in the preset sequence is an odd multiple of 128, for example, 128 or 384. Performing the addition operation on each pixel residual in the pixel residual set and the target difference may be understood as translating the pixel residual set. When the compressed file is generated, the target difference may be added to the header of the compressed file.

A pixel residual in the $i^{th}$ row and the $j^{th}$ column is denoted as $\Delta_{i,j}$. When a length of the pixel residual is 2 bytes, a range of the pixel residual is $[-2^{16}+1, 2^{16}-1]$. Usually, a difference between a maximum value and a minimum value is less than $2^{16}-1$. If the difference exceeds $2^{16}-1$ in an extreme case, this embodiment also provides a supplementary solution.

In a general case, the difference between the maximum value and the minimum value is less than $2^{16}-1$. Because the range of the pixel residual is outside a range of an 8-bit integer, a pixel residual obtained after translation needs to be divided into high-order and low-order bytes due to a limitation of a single-byte processing capability of an entropy encoding module. For example, a division result is two 8-bit integers. If the median of the pixel residual set is close to an integer multiple of 256, high-order byte values obtained after division are random. For example, the pixel residual set is {128, 129, . . . , 383}, and the median is 256, high-order bytes values are randomly 0 and 1, low-order byte entropy is equivalent to original entropy, and more extra costs are generated for encoding the high-order bytes. If the pixel residual set is translated to a set with an odd multiple of 128 as a center, for example, 128 is added to each pixel residual, high-order bytes are all 1 after division, and entropy of the high-order bytes is 0, low-order bytes obtained after division are the same as those of original entropy, and no extra entropy increase is caused.

In a special case, that is, the difference between the maximum value and the minimum value is greater than $2^{16}-1$, a residual symbol is stored separately. As a result, an absolute value part falls within a range of a 16-bit integer, and then the foregoing operation is performed.

When the remote sensing image is greater than available memory space, the remote sensing image may be divided into a plurality of data blocks. Each data block includes images in P bands, and a size of each data block does not exceed a memory capacity. A method for compressing each data block is similar to the image compression method in the embodiment shown in FIG. 3. Compression processes of the plurality of data blocks may be performed in parallel, to improve compression efficiency.

Figure 11:
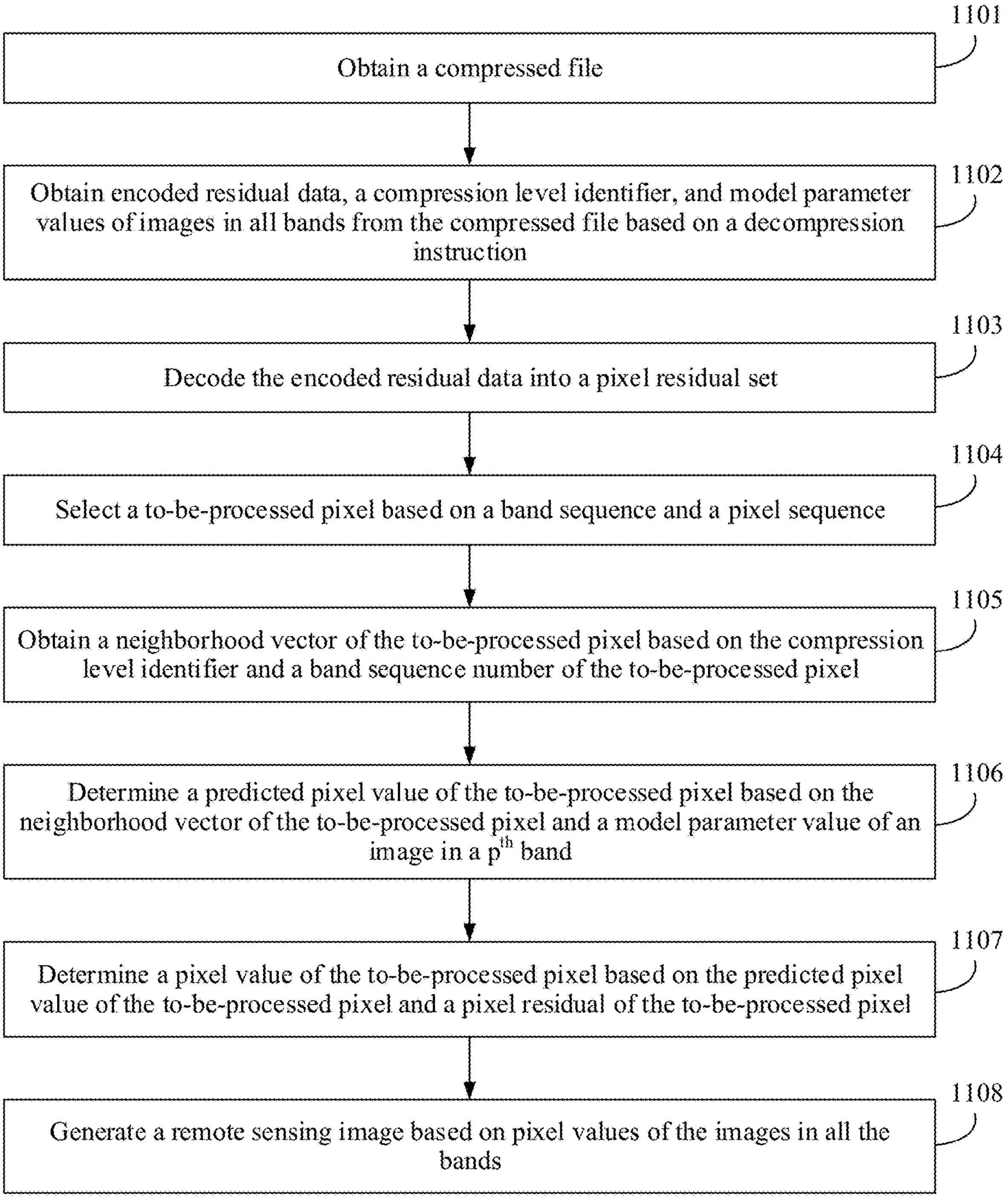
FIG. 11 is a flowchart of an image decompression method according to an embodiment of this application.

The foregoing describes the image compression process, and the following describes an image decompression process in this application. With reference to FIG. 11, an embodiment of the image decompression method in this application includes the following operations.

Operation 1101: Obtain a compressed file.

Operation 1102: Obtain encoded residual data, a compression level identifier, and model parameter values of images in all bands from the compressed file based on a decompression instruction.

Operation 1103: Decode the encoded residual data into a pixel residual set.

Operation 1104: Select a to-be-processed pixel based on a band sequence and a pixel sequence.

The band sequence is a sequence of bands in remote sensing data. The pixel sequence is a sequence of arranging pixels row by row and column by column.

Operation 1105: Obtain a neighborhood vector of the to-be-processed pixel based on the compression level identifier and a band sequence number of the to-be-processed pixel.

The neighborhood vector includes a neighborhood pixel value and a bias term. The bias term is preset, and a specific value may be but is not limited to 1.

In an example, when the compression level identifier is 1 and p=1, the to-be-processed pixel is denoted as $$P^1_{i,j}$$

and neighborhood pixels of the to-be-processed pixel include $$P^1_{i-1,j-1}, P^1_{i-1,j},$$

and $$P^1_{i,j-1}.$$

When i=1 and j=1, three neighborhood pixel values of $$P^1_{i,j}$$

are all 0. When i=1 and j>1, in neighborhood pixel values of $$P^1_{i,j},$$

both a pixel value of $$P^1_{i-1,j-1}$$

and a pixel value of $$P^1_{i-1,j}$$

are 0, and another pixel value is a pixel value of $$P^1_{i,j-1}.$$

When i>1 and j>1, neighborhood pixel values of $$P^{1}_{i,j}$$

include a pixel value of $$P^{1}_{i-1,j-1},$$

a pixel value of $$P^{1}_{i-1,j},$$

and a pixel value of $$P^{1}_{i,j-1}.$$

When the compression level identifier is 1 and p>1, the to-be-processed pixel is denoted as $$P^{p}_{i,j},$$

and neighborhood pixels of the to-be-processed pixel include $$P^{p}_{i-1,j-1}, P^{p}_{i-1,j}, P^{p}_{i,j-1}, P^{p-1}_{i-1,j-1}, P^{p-1}_{i-1,j}, P^{p-1}_{i,j-1},$$

and $$P^{p-1}_{i,j} \cdot P^{p}_{i,j}$$

indicates a pixel in an $i^{th}$ row and a $j^{th}$ column in a $p^{th}$ band, $$P^{p-1}_{i,j}$$

indicates a pixel in an $i^{th}$ row and a $j^{th}$ column in a $(p-1)^{th}$ band, and another pixel may be deduced by analogy.

When i=1 and j=1, in neighborhood pixel values of $$P^{p}_{i,j},$$

other six pixel values are 0 except that of $$P^{p-1}_{i,j}.$$

When i=1 and j>1, in neighborhood pixel values of $$P^{p}_{i,j},$$

other four pixel values are 0 except those of $$P^{p-1}_{i,j}, P^{p}_{i,j-1},$$

and $$P^{p-1}_{i,j-1}.$$

When i>1 and j>1, neighborhood pixels of $$P^{p}_{i,j}$$

include $$P^{p}_{i-1,j-1}, P^{p}_{i-1,j}, P^{p}_{i,j-1}, P^{p-1}_{i-1,j-1}, P^{p-1}_{i-1,j}, P^{p-1}_{i,j-1},$$

and $$P^{p-1}_{i,j}.$$

In another example, when the compression level identifier is 2 and p=1, and a pixel grid of the to-be-processed pixel includes pixels that do not belong to a $1^{st}$ band, pixel values of the pixels that do not belong to the $1^{st}$ band are all 0. When a pixel grid of the to-be-processed pixel belongs to an image in a $1^{st}$ band, neighborhood pixels in the $1^{st}$ band include 15 pixels in the 1st band.

When the compression level identifier is 2 and p>1, and a pixel grid of the to-be-processed pixel includes pixels that do not belong to a $p^{th}$ band, pixel values of pixels that do not belong to a $1^{st}$ band are all 0. When a pixel grid of the to-be-processed pixel belongs to an image in a $p^{th}$ band, neighborhood pixels of the to-be-processed pixel include 15 pixels in the $p^{th}$ band and 16 pixels in a $(p-1)^{th}$ band. When a quantity of neighborhood pixels is another value, corresponding neighborhood pixels may be deduced and obtained by analogy.

Operation 1106: Determine a predicted pixel value of the to-be-processed pixel based on the neighborhood vector of the to-be-processed pixel and a model parameter value of the image in the $p^{th}$ band.

Operation 1107: Determine a pixel value of the to-be-processed pixel based on the predicted pixel value of the to-be-processed pixel and a pixel residual of the to-be-processed pixel. All pixels in each band can be determined according to operations 1104 to 1007.

Operation 1108: Generate a remote sensing image based on pixel values of the images in all the bands.

In this embodiment, because the compression level identifier, the model parameter value, and the pixel residual that are used in the image decompression process are the same as the compression level identifier, the model parameter value, and the pixel residual used in the image compression process, a lossless image decompression method is provided. It should be understood that the model parameter value does not need to be calculated in the decompression process, and therefore a compression speed is higher.

In an optional embodiment, operation 1103 includes: dividing the encoded residual data into encoded high-order byte residual data and encoded low-order byte residual data; decoding the encoded high-order byte residual data into a high-order byte part set by using a finite state entropy encoding algorithm; decoding the encoded low-order byte residual data into a low-order byte part set by using the finite state entropy encoding algorithm; generating a target value set based on the high-order byte part set and the low-order byte part set; and subtracting a target difference from each value in the target value set to obtain the pixel residual set.

In this embodiment, the compressed file further includes the target difference. Specifically, the generating a target value set based on the high-order byte part set and the low-order byte part set includes: forming an $i^{th}$ target value by using an $i^{th}$ high-order byte part and an $i^{th}$ low-order byte part, and generating the target value set based on all target values.

In this embodiment, the encoded residual data is obtained according to the operations in the embodiment shown in FIG. 10, and a sum of a median of the pixel residual set and the target difference is an odd multiple of 128. Pixel residuals of all the bands can be further restored by performing division, decoding, splicing, and a subtraction operation on the encoded residual data.

Figure 12:
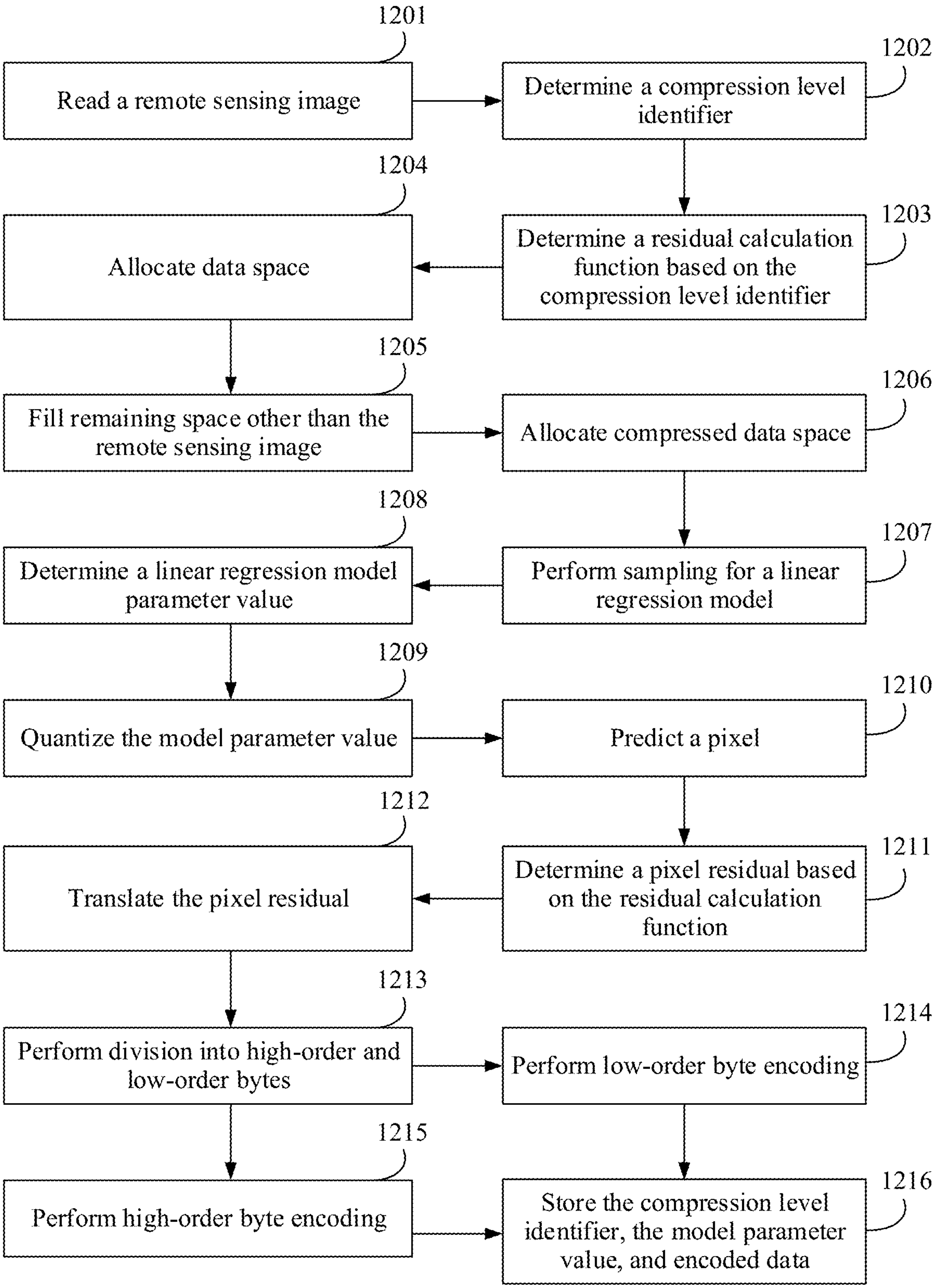
FIG. 12 is another flowchart of an image compression method according to an embodiment of this application.

The following describes the image compression method in this application by using another embodiment. With reference to FIG. 12, the another embodiment of the image compression method in this application includes the following operations.

Operation 1201: Read a remote sensing image.

Operation 1202: Determine a compression level identifier.

The compression level identifier may be preset, or may be input by a user.

Operation 1203: Determine a residual calculation function based on the compression level identifier.

Operation 1204: Allocate data space. The data space is data space to be allocated for the remote sensing image.

Operation 1205: Fill remaining space other than the remote sensing image. The remaining space is a space part of data space other than the remote sensing image.

Operation 1206: Allocate compressed data space.

Operation 1207: Perform sampling for a linear regression model. Specifically, neighborhood pixel values of a plurality of pixels are determined based on the compression level identifier and a band sequence number, to obtain neighborhood vectors of the plurality of pixels.

Operation 1208: Determine a linear regression model parameter value.

A linear regression operation is performed on neighborhood vectors and pixel values that are obtained through sampling, and an obtained coefficient matrix is the linear regression model parameter value. A model parameter value of a first band and a model parameter value of another band are obtained through calculation.

In this application, the linear regression operation may be performed on neighborhood vectors and pixel values of some pixels, to obtain an original model parameter value. Then, a new model parameter value may be obtained after the linear regression operation is performed based on neighborhood vectors of more pixels and pixel values. An old model parameter value is replaced with the new model parameter value to update the model parameter value operation by operation.

Operation 1209: Quantize the model parameter value.

The model parameter value is the linear regression model parameter value. After the linear regression model parameter value is obtained, the linear regression model parameter value may be amplified and rounded. It should be understood that, in a calculation process, space needs to be allocated to data participating in calculation, and data types need to be aligned.

Operation 1210: Predict a pixel.

Specifically, a predicted pixel value of each pixel is determined based on a quantized model parameter value and the neighborhood vector.

Operation 1211: Determine a pixel residual based on the residual calculation function.

A pixel residual of each pixel may be determined by inputting a pixel value and the predicted pixel value of each pixel to the residual calculation function.

Operation 1212: Translate the pixel residual.

Specifically, the pixel residual may be translated by adding a target difference to each pixel residual, so that high-order byte parts of translated pixel residuals are the same.

Operation 1213: Perform division into high-order and low-order bytes.

A high-order byte part and a low-order byte part may be obtained by performing division into the high-order and low-order bytes on the translated pixel residual.

Operation 1214: Perform low-order byte encoding.

Operation 1215: Perform high-order byte encoding.

Specifically, all high-order byte parts are encoded into encoded high-order byte residual data by using an encoding method, and all low-order byte parts are encoded into encoded low-order byte residual data by using the encoding method. The encoding method may be but is not limited to a finite state entropy (FSE) encoding method.

Operation 1216: Store the compression level identifier, the model parameter value, and encoded data.

The encoded data includes the encoded high-order byte residual data and the encoded low-order byte residual data. The compression level identifier, the model parameter value, and the encoded data are stored in a cache, and then a compressed file is generated based on the compression level identifier, the model parameter value, and the encoded data. It should be understood that the compressed file may further include but is not limited to header information of the remote sensing image.

Figure 13:
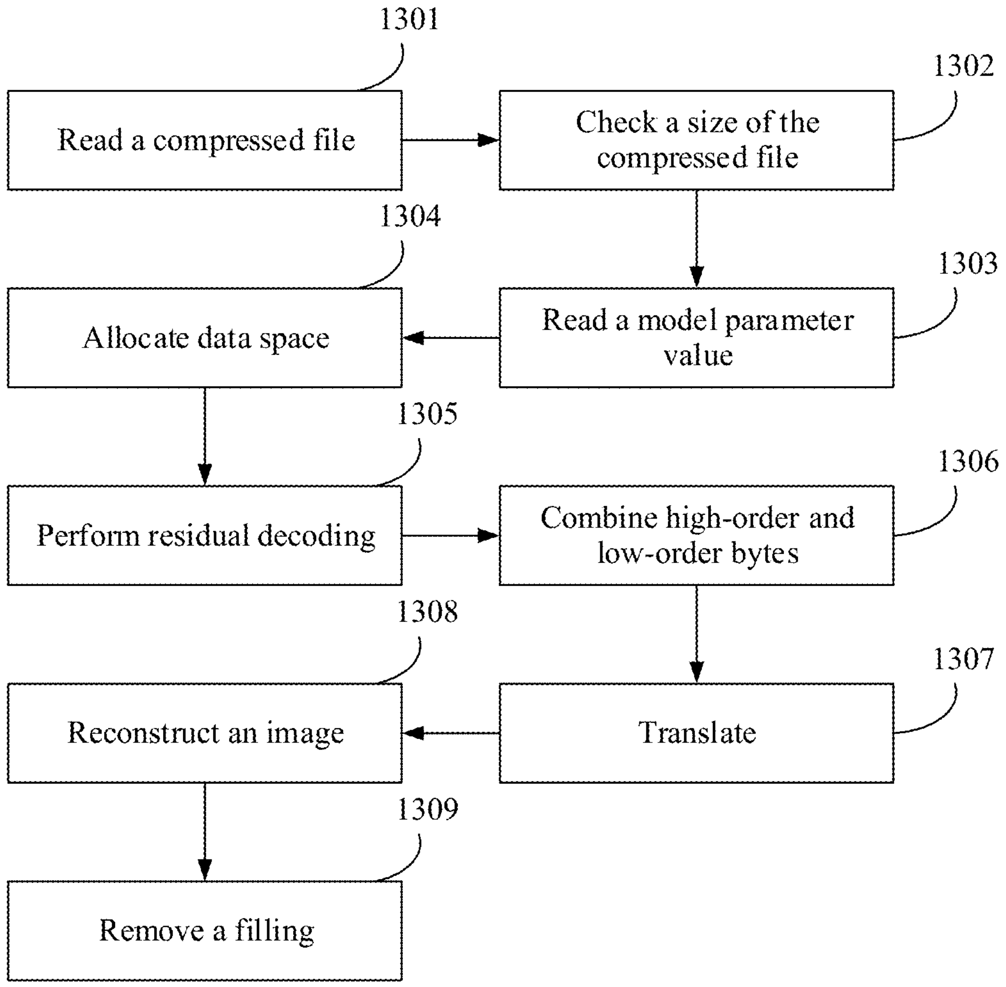
FIG. 13 is a flowchart of an image decompression method according to an embodiment of this application.

The following describes the image decompression method in this application by using another embodiment. With reference to FIG. 13, the another embodiment of the image decompression method in this application includes the following operations.

Operation 1301: Read a compressed file.

Operation 1302: Check a size of the compressed file.

When the size of the compressed file is correct, perform operation 1303; otherwise, the process ends. The compressed file includes encoded residual data, a compression level identifier, and model parameter values of all band images. In this application, whether the model parameter value is correct may be further checked. If the value is incorrect, the process ends.

Operation 1303: Read the model parameter values.

Operation 1304: Allocate data space. Specifically, data space is allocated for data that participates in decoding.

Operation 1305: Perform residual decoding. Specifically, the FSE method is used to separately decode encoded high-order byte residual data and encoded low-order byte residual data, to obtain a high-order byte part set and a low-order byte part set.

Operation 1306: Combine high-order and low-order bytes.

Combine the high-order byte part set and the low-order byte part set into a target value set.

Operation 1307: Perform translation. Specifically, a target difference is subtracted from each value in the target value set, to obtain a pixel residual set.

Operation 1308: Reconstruct an image. Specifically, a predicted pixel value is obtained based on the model parameter value and a neighborhood vector of each pixel, and a pixel value may be obtained based on the predicted pixel value and a pixel residual value.

Operation 1309: Remove a filling. After all pixel values are obtained, a remote sensing image is obtained by removing filled pixels. During actual application, the data space can be released to reduce memory usage.

The following describes an image compression effect and an image decompression effect in this application by using a group of specific data. For a satellite remote sensing image including 15 bands, when a compression level is selected as level 1, image compression information and image decompression information are shown in Table 3.

TABLE 3

| | |
|---|---|
| Size of the satellite remote sensing image | 304.25 MB |
| Size of a compressed file | 83.58 MB |
| Compression rate | 3.64 |
| Single-core single-thread compression speed | 57.00 MBps |
| Single-core single-thread decompression speed | 113.32 MBps |

A throughput of an existing CCSDS method is about 10 MB/s, that is, an image compression speed and an image decompression speed are both about 10 MB/s. Compared with that in the CCSDS method, both the image compression speed and the image decompression speed in this application are greatly increased.

This application further provides an interface for a user for inputting different compression parameters.

In an embodiment, an instruction input by the user is fractalrs [-d] [-s D H W] [-l level][-o output file] [-h] [-r] input file. Herein, fractalrs indicates an instruction type; -d indicates decompression; -s D H W indicates a depth, a height, and a width of a file; -r indicates that data is read or written in a reverse byte order; -l indicates that a compression level identifier is 1, and 1 is a default compression level identifier; -o indicates a prefix of an output file, and a default prefix is output.bin; -h indicates help information; and input file indicates an input file.

In this embodiment, after the foregoing instruction is used, an image processing apparatus may compress or decompress the input file based on an input compression parameter. For a compression method, refer to the image compression method in the embodiment shown in FIG. 3. For a decompression method, refer to the image decompression method in the embodiment shown in FIG. 11. It should be understood that the user may enter, according to an actual requirement, one or more compression parameters included in the instruction.

The following describes an image compression effect and an image decompression effect in this application by using another group of specific data. For a satellite remote sensing image including 8 bands, when a compression level is selected as level 1, image compression information and image decompression information are shown in Table 4.

TABLE 4

| | |
|---|---|
| Size of the satellite remote sensing image | 322.53 MB |
| Size of a compressed file | 112.22 MB |
| Compression rate | 2.87 |
| Single-core single-thread compression speed | 61.60 MBps |
| Single-core single-thread decompression speed | 107.85 MBps |

Figure 14:
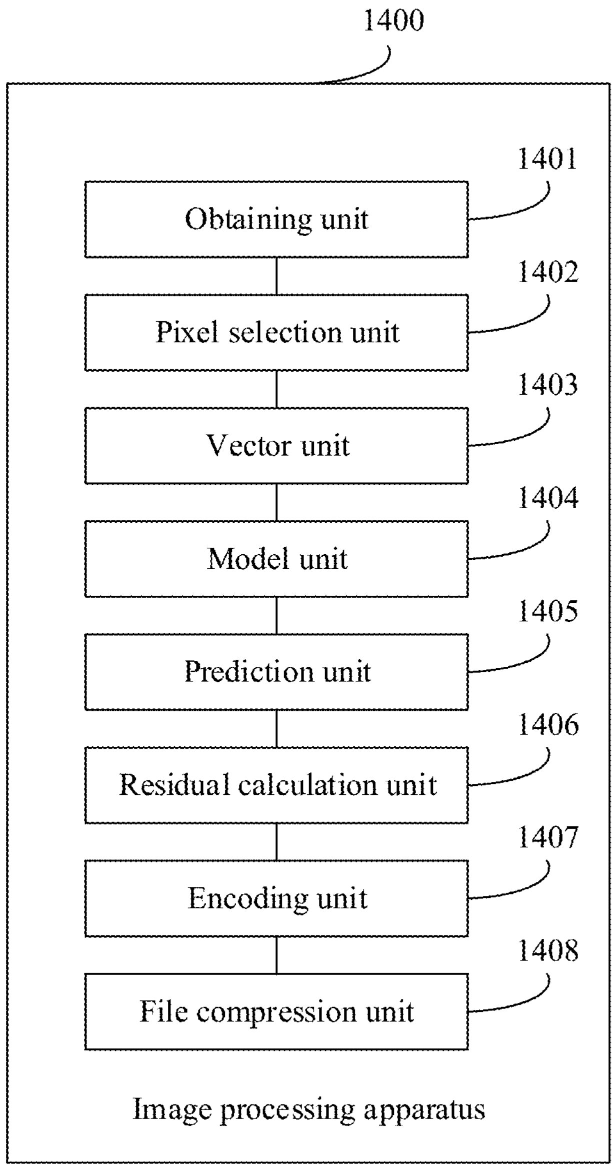
FIG. 14 is a diagram of a structure of an image processing apparatus according to an embodiment of this application.

This application further provides an image processing apparatus 1400 that can implement the foregoing image compression method. With reference to FIG. 14, in an embodiment, the image processing apparatus 1400 includes:

an obtaining unit 1401, configured to obtain a remote sensing image, where the remote sensing image includes images in a plurality of bands;

a pixel selection unit 1402, configured to select a plurality of pixels from an image in a $p^{th}$ band, where p is a positive integer;

a vector unit 1403, configured to determine a neighborhood vector of each pixel in the image in the $p^{th}$ band based on a compression level identifier and p, where the neighborhood vector includes a neighborhood pixel value and a bias term;

a model unit 1404, configured to: generate a pixel value matrix based on neighborhood vectors of the plurality of pixels, and perform a linear regression operation on the pixel value matrix, a transposed matrix of the pixel value matrix, and pixel values of the plurality of pixels, to obtain a model parameter value of the image in the $p^{th}$ band;

a prediction unit 1405, configured to obtain, through calculation based on the model parameter value of the image in the $p^{th}$ band and the neighborhood vector of each pixel in the image in the $p^{th}$ band, a predicted pixel value of each pixel in the image in the $p^{th}$ band;

a residual calculation unit 1406, configured to determine a pixel residual of each pixel in the image in the $p^{th}$ band based on all pixel values of the image in the $p^{th}$ band and all predicted pixel values of the image in the $p^{th}$ band;

an encoding unit 1407, configured to: generate a pixel residual set based on pixel residuals of all pixel in images in all the bands, and encode the pixel residual set to obtain encoded residual data; and a file compression unit 1408, configured to generate a compressed file based on the encoded residual data, the compression level identifier, and model parameter values of the images in all the bands.

In an optional embodiment, the pixel selection unit 1402 is specifically configured to: select a plurality of pixel grids from the image in the $p^{th}$ band, and select one pixel from a same location of each of the plurality of pixel grids, to obtain the plurality of pixels.

In another optional embodiment, the vector unit 1403 is specifically configured to: when p is equal to 1, sequentially select target pixels from the image in the $p^{th}$ band, determine, based on the compression level identifier and a location of the target pixel, a first pixel grid in which the target pixel is located, and determine that neighborhood pixels of the target pixel include another pixel other than the target pixel in the first pixel grid; or when p is greater than 1, sequentially select target pixels from the image in the $p^{th}$ band, determine a first pixel grid and a second pixel grid based on the compression level identifier and a location of the target pixel, and determine that neighborhood pixels of the target pixel include the second pixel grid and another pixel other than the target pixel in the first pixel grid, where the first pixel grid and the second pixel grid have a same size, and a location of the first pixel grid in the image in the $p^{th}$ band is the same as a location of the second pixel grid in an image in a $(p-1)^{th}$ band; and generate the neighborhood vector of each pixel based on the neighborhood pixel value of each pixel and the bias term.

In another optional embodiment, the compression level identifier is a compression level sequence number, and the compression level sequence number is linearly correlated with a quantity of rows of the first pixel grid.

In another optional embodiment, the prediction unit 1405 is specifically configured to: perform a multiplication operation on the model parameter value of the image in the $p^{th}$ band and 2 to a kth power, where k is a positive integer; round a result of the multiplication operation; perform a matrix multiplication operation on the neighborhood vector of each pixel in the image in the $p^{th}$ band and a result of the multiplication operation obtained after rounding; and shift a result of the matrix multiplication operation to the right by k places, to obtain the predicted pixel value of each pixel in the image in the $p^{th}$ band.

In another optional embodiment, the encoding unit 1407 is specifically configured to: select, from a preset sequence based on a median of the pixel residual set, a target value greater than the median, where each value in the preset sequence is an odd multiple of 128; determine that a target difference is equal to the target value minus the median; perform an addition operation on each pixel residual in the pixel residual set and the target difference; divide each result of the addition operation into a high-order byte part and a low-order byte part; encode low-order byte parts of all results of addition operations into encoded low-order byte residual data by using a finite state entropy encoding algorithm; encode high-order byte parts of all results of the addition operations into encoded high-order byte residual data by using the finite state entropy encoding algorithm; and form the encoded residual data based on the encoded low-order byte residual data and the encoded high-order byte residual data.

Figure 15:
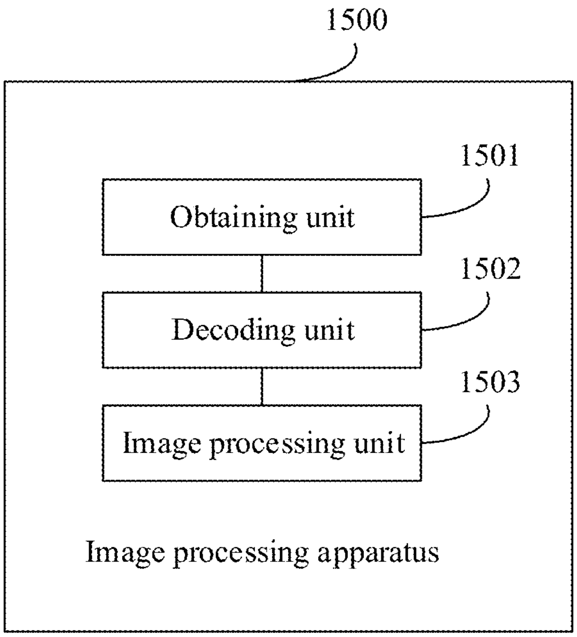
FIG. 15 is a diagram of another structure of an image processing apparatus according to an embodiment of the present invention.

This application further provides an image processing apparatus 1500 that can implement the foregoing image decompression method. With reference to FIG. 15, in an embodiment, the image processing apparatus 1500 includes:

an obtaining unit 1501, configured to: obtain a compressed file, and obtain encoded residual data, a compression level identifier, and model parameter values of images in all bands from the compressed file based on a decompression instruction;

a decoding unit 1502, configured to decode the encoded residual data into a pixel residual set;

an image processing unit 1503, configured to: select a to-be-processed pixel based on a band sequence and a pixel sequence; obtain a neighborhood vector of the to-be-processed pixel based on the compression level identifier and a band sequence number of the to-be-processed pixel, where the neighborhood vector includes a neighborhood pixel value and a bias term; determine a predicted pixel value of the to-be-processed pixel based on the neighborhood vector of the to-be-processed pixel and a model parameter value of an image in a $p^{th}$ band; determine a pixel value of the to-be-processed pixel based on the predicted pixel value of the to-be-processed pixel and a pixel residual of the to-be-processed pixel; and generate a remote sensing image based on pixel values of the images in all the bands.

In an optional embodiment, the decoding unit 1502 is specifically configured to: when the compressed file includes a target difference, divide the encoded residual data into encoded high-order byte residual data and encoded low-order byte residual data; decode the encoded high-order byte residual data into a high-order byte part set by using a finite state entropy encoding algorithm; decode the encoded low-order byte residual data into a low-order byte part set by using the finite state entropy encoding algorithm; generate a target value set based on the high-order byte part set and the low-order byte part set; and subtract the target difference from each value in the target value set to obtain the pixel residual set, where a sum of a median of the pixel residual set and the target difference is an odd multiple of 128.

Figure 16:
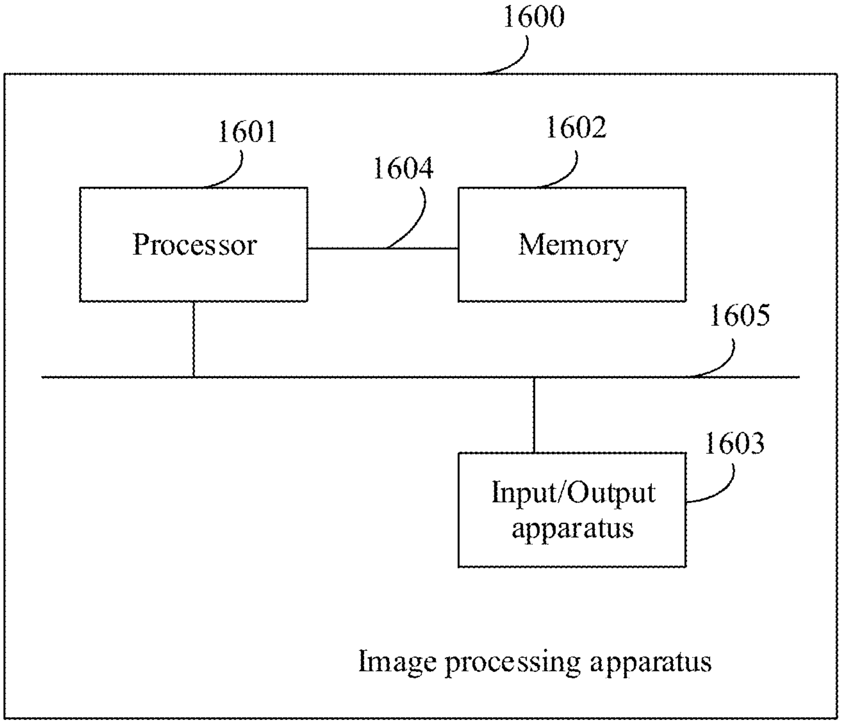
FIG. 16 is a diagram of another structure of an image processing apparatus according to an embodiment of the present invention.

This application provides an image processing apparatus 1600 that can implement the image compression method and the image decompression method. With reference to FIG. 16, in an embodiment, the image processing apparatus 1600 includes a processor 1601, a memory 1602, and an input/output device 1603. There may be one or more processors 1601, memories 1602, and input/output (I/O) devices 1603.

In embodiments of this application, the processor 1601 may be a central processing unit (CPU), or may be another application-specific integrated circuit (ASIC). The processor 1601 may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like.

The memory 1602 is a main memory of the image processing apparatus 1600. Generally, a dynamic random access memory (DRAM) is used as the memory 1602. The processor 1601 can access the internal memory 1602 at a high speed through an internal memory controller, and perform a read operation and a write operation on any storage unit in the internal memory 1602. In addition to the DRAM, the internal memory 1602 may alternatively be another random access memory, for example, a static random access memory (SRAM). In addition, the internal memory 1602 may alternatively be a read-only memory (ROM). For example, the read-only memory may be a programmable read only memory (PROM), an erasable programmable read-only memory (EPROM), or the like. A quantity of internal memories 1602 and a type of the internal memory 1602 are not limited in this embodiment. In addition, the internal memory 1602 may be configured to have a battery-protected function. The battery-protected function means that data stored in a memory is not lost when a system is powered off and then powered on again. The battery-protected internal memory 1602 is referred to as a non-volatile memory.

The input/output device 1603 is hardware that can perform data transmission, or may be understood as a device connected to an I/O interface. Common I/O devices include a network adapter, a printer, a keyboard, a mouse, and the like. All external memories may also be used as I/O devices, such as hard disks, floppy disks, and optical discs.

The processor 1601 is connected to the memory 1602 through a bus 1604, and the processor 1601 is connected to the input/output device 1603 through a bus 1605. The bus 1604 may be but is not limited to a double data rate (DDR) bus, and the bus 1605 may be but is not limited to a PCIe bus. Herein, different internal memories 1602 may communicate with the processor 1601 through different data buses. Therefore, the DDR bus 1604 may alternatively be replaced with another type of data bus. A bus type is not limited in embodiments of this application.

In this embodiment, the memory 1602 is configured to store a program, and the processor 1601 can perform, by invoking the program stored in the memory 1602, the image compression method in the embodiment shown in FIG. 3 or the image decompression method in the embodiment shown in FIG. 11.

It should be noted that content such as information exchange between the modules/units of the apparatus and the execution processes thereof is based on the same idea as the method embodiments of this application, and produces the same technical effects as the method embodiments of this application. For specific content, refer to the foregoing descriptions in the method embodiments of this application. Details are not described herein again.

This application provides a computer-readable storage medium. The computer-readable storage medium stores a computer program. When the computer program is run on a computer, the computer is enabled to perform the communication method in the foregoing embodiments or the optional embodiments.

This application further provides a computer program product. When the computer program product runs on a computer, the computer is enabled to perform the communication method in the foregoing embodiments or the optional embodiments.

This application further provides a chip system. The chip system includes a processor and a memory that are coupled to each other. The memory is configured to store a computer program or instructions. The processing unit is configured to execute the computer program or the instructions stored in the memory, so that the chip system is enabled to perform the operations performed by the image processing apparatus in the foregoing embodiments. Optionally, the memory is a memory in a chip, for example, a register or a cache. Alternatively, the memory may be a memory outside a chip in a station, for example, a read-only memory (ROM) or another type of static storage device that can store static information and instructions, or a random access memory (RAM). The processor mentioned above may be a general-purpose central processing unit, a microprocessor, an application-specific integrated circuit (ASIC), or one or more integrated circuits configured to implement the foregoing communication method.

In addition, it should be noted that the described apparatus embodiments are merely an example. The units described as separate parts may be or may not be physically separate, and parts presented as units may be or may not be physical units, may be located at one position, or may be distributed on a plurality of network units. Some or all the modules may be selected according to actual needs to achieve the objectives of the solutions of embodiments. In addition, in the accompanying drawings of the apparatus embodiments provided in this application, connection relationships between modules indicate that the modules have communication connections with each other, and may be specifically implemented as one or more communication buses or signal cables.

Based on the description of the foregoing implementations, persons skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to implement a same function may be in various forms, for example, in a form of analog circuit, a digital circuit, or a dedicated circuit. However, for this application, a software program implementation is a better implementation in most cases. Based on such an understanding, the technical solutions of this application essentially or the part contributing to the conventional technology may be implemented in a form of software product. The computer software product is stored in a readable storage medium, for example, a floppy disk, a USB flash drive, a removable hard disk, a ROM, a RAM, a magnetic disk, or an optical disc of a computer, and includes several instructions for indicating a computer device (which may be a personal computer, a server, or a network device) to perform the methods described in embodiments of this application.

All or some of the foregoing embodiments may be implemented by using software, hardware, firmware, or any combination thereof. When software is used to implement the embodiments, all or a part of the embodiments may be implemented in a form of computer program product.

The computer program product includes one or more computer instructions. When the computer program instructions are loaded and executed on a computer, all or some of the procedures or functions in embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. An image compression method, comprising:

obtaining a remote sensing image, wherein the remote sensing image comprises images in a plurality of bands;

selecting a plurality of pixels from an image in a $p^{th}$ band, wherein p is a positive integer;

obtaining a neighborhood vector of each pixel in the image in the $p^{th}$ band based on a compression level identifier and p, wherein the neighborhood vector comprises a neighborhood pixel value and a bias term;

generating a pixel value matrix based on neighborhood vectors of the plurality of pixels;

performing a linear regression operation on the pixel value matrix, a transposed matrix of the pixel value matrix, and pixel values of the plurality of pixels, to obtain a model parameter value of the image in the $p^{th}$ band;

obtaining, through calculation based on the model parameter value of the image in the $p^{th}$ band and the neighborhood vector of each pixel in the image in the $p^{th}$ band, a predicted pixel value of each pixel in the image in the $p^{th}$ band;

obtaining a pixel residual of each pixel in the image in the $p^{th}$ band based on all pixel values of the image in the $p^{th}$ band and all predicted pixel values of the image in the $p^{th}$ band;

generating a pixel residual set based on pixel residuals of all pixels in the images in all the bands;

encoding the pixel residual set to obtain encoded residual data; and generating a compressed file based on the encoded residual data, the compression level identifier, and model parameter values of the images in all the bands.

2. The method according to claim 1, wherein the selecting a plurality of pixel from an image in a $p^{th}$ band comprises:

selecting a plurality of pixel grids from the image in the $p^{th}$ band; and selecting one pixel from a same location of each of the plurality of pixel grids, to obtain the plurality of pixels.

3. The method according to claim 1, wherein the determining a neighborhood vector of each pixel in the image in the $p^{th}$ band based on a compression level identifier and p comprises:

when p is equal to 1, sequentially selecting target pixels from the image in the $p^{th}$ band, determining, based on the compression level identifier and a location of the target pixel, a first pixel grid in which the target pixel is located, and determining that neighborhood pixels of the target pixel comprise another pixel other than the target pixel in the first pixel grid; or when p is greater than 1, sequentially selecting target pixels from the image in the $p^{th}$ band, determining a first pixel grid and a second pixel grid based on the compression level identifier and a location of the target pixel, and determining that neighborhood pixels of the target pixel comprise pixels in the second pixel grid and another pixel other than the target pixel in the first pixel grid, wherein the first pixel grid and the second pixel grid have a same size, and a location of the first pixel grid in the image in the $p^{th}$ band is the same as a location of the second pixel grid in an image in a $(p-1)^{th}$ band; and generating the neighborhood vector of each pixel based on the neighborhood pixel value of each pixel and the bias term.

4. The method according to claim 3, wherein the compression level identifier is a compression level sequence number, and the compression level sequence number is linearly correlated with a quantity of rows of the first pixel grid.

5. The method according to claim 1, wherein the obtaining, through calculation based on the model parameter value of the image in the $p^{th}$ band and the neighborhood vector of each pixel in the image in the $p^{th}$ band, a predicted pixel value of each pixel in the image in the $p^{th}$ band comprises:

performing a multiplication operation on the model parameter value of the image in the $p^{th}$ band and 2 to a $k^{th}$ power, wherein k is a positive integer;

rounding a result of the multiplication operation;

performing a matrix multiplication operation on the neighborhood vector of each pixel in the image in the $p^{th}$ band and a result of the multiplication operation obtained after rounding; and shifting a result of the matrix multiplication operation to the right by k places, to obtain the predicted pixel value of each pixel in the image in the $p^{th}$ band.

6. The method according to claim 1, wherein the encoding the pixel residual set to obtain encoded residual data comprises:

selecting, from a preset sequence based on a median of the pixel residual set, a target value greater than the median, wherein each value in the preset sequence is an odd multiple of 128;

determining that a target difference is equal to the target value minus the median;

performing an addition operation on each pixel residual in the pixel residual set and the target difference;

dividing each result of the addition operation into a high-order byte part and a low-order byte part;

encoding low-order byte parts of all results of addition operations into encoded low-order byte residual data by using a finite state entropy encoding algorithm;

encoding high-order byte parts of all results of the addition operations into encoded high-order byte residual data by using the finite state entropy encoding algorithm; and forming the encoded residual data based on the encoded low-order byte residual data and the encoded high-order byte residual data.

7. An image decompression method, comprising:

obtaining a compressed file;

obtaining encoded residual data, a compression level identifier, and model parameter values of images in all bands from the compressed file based on a decompression instruction;

decoding the encoded residual data into a pixel residual set;

selecting a to-be-processed pixel based on a band sequence and a pixel sequence;

obtaining a neighborhood vector of the to-be-processed pixel based on the compression level identifier and a band sequence number of the to-be-processed pixel, wherein the neighborhood vector comprises a neighborhood pixel value and a bias term;

determining a predicted pixel value of the to-be-processed pixel based on the neighborhood vector of the to-be-processed pixel and a model parameter value of an image in a $p^{th}$ band;

determining a pixel value of the to-be-processed pixel based on the predicted pixel value of the to-be-processed pixel and a pixel residual of the to-be-processed pixel; and generating a remote sensing image based on pixel values of the images in all the bands.

8. The method according to claim 7, wherein the compressed file further comprises a target difference; and the decoding the encoded residual data into a pixel residual set comprises:

dividing the encoded residual data into encoded high-order byte residual data and encoded low-order byte residual data;

decoding the encoded high-order byte residual data into a high-order byte part set by using a finite state entropy encoding algorithm;

decoding the encoded low-order byte residual data into a low-order byte part set by using the finite state entropy encoding algorithm;

generating a target value set based on the high-order byte part set and the low-order byte part set; and subtracting the target difference from each value in the target value set to obtain the pixel residual set, wherein a sum of a median of the pixel residual set and the target difference is an odd multiple of 128.

9. An image processing apparatus, comprising:

at least one processor; and a computer-readable storage medium coupled to the at least one processor and storing programming instructions, the programming instructions, when executed by the at least one processor, instruct the at least one processor to perform the following operations:

obtaining a remote sensing image, wherein the remote sensing image comprises images in a plurality of bands;

selecting a plurality of pixels from an image in a $p^{th}$ band, wherein p is a positive integer;

obtaining a neighborhood vector of each pixel in the image in the $p^{th}$ band based on a compression level identifier and p, wherein the neighborhood vector comprises a neighborhood pixel value and a bias term;

generating a pixel value matrix based on neighborhood vectors of the plurality of pixels;

performing a linear regression operation on the pixel value matrix, a transposed matrix of the pixel value matrix, and pixel values of the plurality of pixels, to obtain a model parameter value of the image in the $p^{th}$ band;

obtaining, through calculation based on the model parameter value of the image in the $p^{th}$ band and the neighborhood vector of each pixel in the image in the $p^{th}$ band, a predicted pixel value of each pixel in the image in the $p^{th}$ band;

obtaining a pixel residual of each pixel in the image in the $p^{th}$ band based on all pixel values of the image in the $p^{th}$ band and all predicted pixel values of the image in the $p^{th}$ band;

generating a pixel residual set based on pixel residuals of all pixels in the images in all the bands;

encoding the pixel residual set to obtain encoded residual data; and generating a compressed file based on the encoded residual data, the compression level identifier, and model parameter values of the images in all the bands.

10. The image processing apparatus according to claim 9, wherein the selecting a plurality of pixel from an image in a $p^{th}$ band comprises:

selecting a plurality of pixel grids from the image in the $p^{th}$ band; and selecting one pixel from a same location of each of the plurality of pixel grids, to obtain the plurality of pixels.

11. The image processing apparatus according to claim 9, wherein the obtaining a neighborhood vector of each pixel in the image in the $p^{th}$ band based on a compression level identifier and p comprises:

when p is equal to 1, sequentially selecting a target pixel from the image in the $p^{th}$ band, obtaining, based on the compression level identifier and a location of the target pixel, a first pixel grid in which the target pixel is located, and obtaining that neighborhood pixels of the target pixel comprise another pixel other than the target pixel in the first pixel grid; or when p is greater than 1, sequentially selecting target pixels from the image in the $p^{th}$ band, obtaining a first pixel grid and a second pixel grid based on the compression level identifier and a location of the target pixel, and obtaining that neighborhood pixels of the target pixel comprise pixels in the second pixel grid and another pixel other than the target pixel in the first pixel grid, wherein the first pixel grid and the second pixel grid have a same size, and a location of the first pixel grid in the image in the $p^{th}$ band is the same as a location of the second pixel grid in an image in a $(p-1)^{th}$ band; and generating the neighborhood vector of each pixel based on the neighborhood pixel value of each pixel and the bias term.

12. The image processing apparatus according to claim 11, wherein the compression level identifier is a compression level sequence number, and the compression level sequence number is linearly correlated with a quantity of rows of the first pixel grid.

13. The image processing apparatus according to claim 9, wherein the obtaining, through calculation based on the model parameter value of the image in the $p^{th}$ band and the neighborhood vector of each pixel in the image in the $p^{th}$ band, a predicted pixel value of each pixel in the image in the $p^{th}$ band comprises:

performing a multiplication operation on the model parameter value of the image in the $p^{th}$ band and 2 to a $k^{th}$ power, wherein k is a positive integer;

rounding a result of the multiplication operation;

performing a matrix multiplication operation on the neighborhood vector of each pixel in the image in the $p^{th}$ band and a result of the multiplication operation obtained after rounding; and shifting a result of the matrix multiplication operation to the right by k places, to obtain the predicted pixel value of each pixel in the image in the $p^{th}$ band.

14. The image processing apparatus according to claim 9, wherein the encoding the pixel residual set to obtain encoded residual data comprises:

selecting, from a preset sequence based on a median of the pixel residual set, a target value greater than the median, wherein each value in the preset sequence is an odd multiple of 128;

obtaining that a target difference is equal to the target value minus the median;

performing an addition operation on each pixel residual in the pixel residual set and the target difference;

dividing each result of the addition operation into a high-order byte part and a low-order byte part;

encoding low-order byte parts of all results of addition operations into encoded low-order byte residual data by using a finite state entropy encoding algorithm;

encoding high-order byte parts of all results of the addition operations into encoded high-order byte residual data by using the finite state entropy encoding algorithm; and forming the encoded residual data based on the encoded low-order byte residual data and the encoded high-order byte residual data.

* * * * *